US012809328B2

(12) United States Patent

Suzuki et al.

(10) Patent No.: US 12,809,328 B2

(45) Date of Patent: Nov. 24, 2026

(54) PRODUCTION SYSTEM, PROGRAM CREATION DEVICE, AND INFORMATION STORAGE MEDIUM

(71) Applicant: Kabushiki Kaisha Yaskawa Denki, Kitakyushu (JP)

(72) Inventors: Takahiko Suzuki, Kitakyushu (JP); Hiromasa Shimizu, Kitakyushu (JP); Yu Katono, Kitakyushu (JP); Yosuke Kamiya, Kitakyushu (JP)

(73) Assignee: Kabushiki Kaisha Yaskawa Denki, Kitakyushu (JP)

( * ) Notice: Subject to any disclaimer, the term of this patent is extended or adjusted under 35 U.S.C. 154(b) by 288 days.

(21) Appl. No.: 18/403,118

(22) Filed: Jan. 3, 2024

(65) Prior Publication Data

US 2024/0134336 A1 Apr. 25, 2024
US 2024/0231302 A9 Jul. 11, 2024

Related U.S. Application Data

(63) Continuation of application No. PCT/JP2022/026845, filed on Jul. 6, 2022.

(30) Foreign Application Priority Data

Jul. 9, 2021 (JP) ................................ 2021-114276

(51) Int. Cl.
*G05B 19/05* (2006.01)

(52) U.S. Cl.
CPC .... *G05B 19/05* (2013.01); *G05B 2219/13049* (2013.01)

(58) Field of Classification Search
CPC .................................................. G05B 19/056
See application file for complete search history.

(56) References Cited

U.S. PATENT DOCUMENTS

| | | | |
|---|---|---|---|
| 2011/0230978 A1 | 9/2011 | Jie et al. | |
| 2013/0218299 A1 | 8/2013 | Jie et al. | |
| 2014/0026145 A1 * | 1/2014 | Canedo ................ | G06F 9/4881 718/105 |

(Continued)

FOREIGN PATENT DOCUMENTS

| | | |
|---|---|---|
| JP | 2012-194678 A | 10/2012 |
| JP | 2018-106440 A | 7/2018 |
| JP | 2020-61104 A | 4/2020 |

OTHER PUBLICATIONS

Extended European Search Report issued Jun. 12, 2025, in European Patent Application No. 22837705.7, 10 pages.

(Continued)

*Primary Examiner* — George Chen

(74) *Attorney, Agent, or Firm* — Oblon, McClelland, Maier & Neustadt, L.L.P.

(57) ABSTRACT

Provided is a production system, comprising circuitry configured to: associate a plurality of rungs included in a ladder program with one of a plurality of scan groups each having an execution cycle that is specifiable; allocate each of the plurality of scan groups to one of a plurality of processor cores of a controller so that each of the plurality of scan groups is distributed; and execute one or more rungs associated with one or more scan groups allocated to each of the plurality of processor cores in parallel in each of the execution cycles.

20 Claims, 25 Drawing Sheets

(56) References Cited

U.S. PATENT DOCUMENTS

| | | | |
|---|---|---|---|
| 2014/0165077 | A1 | 6/2014 | Martinez Canedo et al. |
| 2019/0324815 | A1 | 10/2019 | Kümmel et al. |
| 2020/0151033 | A1 | 5/2020 | Aramaki et al. |
| 2021/0373538 | A1 | 12/2021 | Imai et al. |

OTHER PUBLICATIONS

International Search Report issued Aug. 30, 2022 in PCT/JP2022/026845 filed on Jul. 6, 2022, 2 pages.

* cited by examiner

FIG.13

D1

| CONTROL GROUP NAME | AXIS NAME | AXIS OUTPUT |
|---|---|---|
| CONTROL GROUP 1 | AXIS 1 | REGISTER IDENTIFICATION INFORMATION 1 |
| | AXIS 2 | REGISTER IDENTIFICATION INFORMATION 2 |
| | AXIS 3 | REGISTER IDENTIFICATION INFORMATION 3 |
| CONTROL GROUP 2 | AXIS 4 | REGISTER IDENTIFICATION INFORMATION 4 |
| | AXIS 5 | REGISTER IDENTIFICATION INFORMATION 5 |
| | AXIS 6 | REGISTER IDENTIFICATION INFORMATION 6 |
| | AXIS 7 | REGISTER IDENTIFICATION INFORMATION 7 |
| CONTROL GROUP 3 | AXIS 8 | REGISTER IDENTIFICATION INFORMATION 8 |
| | AXIS 9 | REGISTER IDENTIFICATION INFORMATION 9 |
| | AXIS 10 | REGISTER IDENTIFICATION INFORMATION 10 |

FIG.14

D2

| ELEMENT | PROCESSING TIME |
|---|---|
| GRAPHIC 1 | 15 μs |
| GRAPHIC 2 | 8 μs |
| GRAPHIC 3 | 10 μs |
| COMMAND 4 | 5 μs |
| COMMAND 5 | 30 μs |
| COMMAND 6 | 20 μs |
| ⋮ | ⋮ |

FIG.15

D3

| SCAN GROUP NAME | SCAN GROUP TYPE | CONTROL GROUP NAME | EXECUTION CYCLE | PROCESSOR CORE | LADDER PROGRAM NAME |
|---|---|---|---|---|---|
| SCAN GROUP A | FIXED CYCLE | CONTROL GROUP 1 | 0.125ms | CPU21A CORE 1 | DRAWING A<br>DRAWING A01<br>DRAWING A01.01 |
| SCAN GROUP B | FIXED CYCLE | CONTROL GROUP 2 | 0.250ms | CPU21A CORE 1 | DRAWING B<br>DRAWING B01<br>DRAWING B01.01 |
| SCAN GROUP C | FIXED CYCLE | CONTROL GROUP 3 | 0.250ms | CPU21B CORE 1 | DRAWING C<br>DRAWING C01<br>DRAWING C01.01 |

FIG.18

D1

| CONTROL GROUP NAME | CONTROL CYCLE | AXIS NAME | AXIS OUTPUT |
|---|---|---|---|
| CONTROL GROUP 1 | 1ms | AXIS 1 | REGISTER IDENTIFICATION INFORMATION 1 |
| | | AXIS 2 | REGISTER IDENTIFICATION INFORMATION 2 |
| | | AXIS 3 | REGISTER IDENTIFICATION INFORMATION 3 |
| | | AXIS 4 | REGISTER IDENTIFICATION INFORMATION 4 |
| | | AXIS 5 | REGISTER IDENTIFICATION INFORMATION 5 |
| | | AXIS 6 | REGISTER IDENTIFICATION INFORMATION 6 |
| CONTROL GROUP 2 | 1ms | AXIS 7 | REGISTER IDENTIFICATION INFORMATION 7 |
| | | AXIS 8 | REGISTER IDENTIFICATION INFORMATION 8 |
| | | AXIS 9 | REGISTER IDENTIFICATION INFORMATION 9 |
| | | AXIS 10 | REGISTER IDENTIFICATION INFORMATION 10 |

Gr1 (AXIS 1–AXIS 6)

Gr2 (AXIS 7–AXIS 10)

FIG.19

| | | REGISTER | | | | | | | | | | | | | | |
|---|---|---|---|---|---|---|---|---|---|---|---|---|---|---|---|---|
| | | reg1 | reg2 | reg3 | reg4 | reg5 | reg6 | reg7 | reg8 | reg9 | reg10 | reg11 | reg12 | reg13 | Gr1 | Gr2 |
| RUNG | A | w | | | | | | | | | | | | | | |
| | B | r | w | | | | | | | | | | | | | |
| | C | | | w | | | | | | | | | | | | |
| | D | | | r | w | | | | | | | | | | | |
| | E | | | | | w | | | | | | | | | | |
| | F | | | | | r | w | | | | | | | | | |
| | G | | | | | | | w | | | | | | | | |
| | H | | | | | | | r | w | | | | | | | |
| | I | | | | | | | | | w | | | | | | |
| | J | | | | | | | | | r | w | | | | | |
| | K | | | | | | r | | | | | w | | | | |
| | L | | r | | r | | r | | | | | | w | | w | |
| | M | | r | | r | | | | r | | | | | w | | w |
| | N | | | | | | r | | | | | | | | w | |

PRODUCTION SYSTEM, PROGRAM CREATION DEVICE, AND INFORMATION STORAGE MEDIUM

CROSS-REFERENCE TO RELATED APPLICATION

The present disclosure contains subject matter related to that disclosed in International Patent Application PCT/JP2022/026845 filed in the Japan Patent Office on Jul. 6, 2022, the entire contents of which are hereby incorporated by reference.

BACKGROUND OF THE INVENTION

1. Field of the Invention

The present disclosure relates to a production system, a program creation device, and an information storage medium.

2. Description of the Related Art

Hitherto, there has been known a technology for creating a ladder program which indicates operations of an industrial machine such as a programmable logic controller (PLC). For example, in JP 2012-194678 A, there is described a technology which uses a program development support device to create a ladder program indicating operations of a PLC.

SUMMARY OF THE INVENTION

According to one aspect of the present disclosure, there is provided a production system, comprising circuitry configured to: associate a plurality of rungs included in a ladder program with one of a plurality of scan groups each having an execution cycle that is specifiable; allocate each of the plurality of scan groups to one of a plurality of processor cores of a controller so that each of the plurality of scan groups is distributed; and execute one or more rungs associated with one or more scan groups allocated to each of the plurality of processor cores in parallel in each of the execution cycles.

BRIEF DESCRIPTION OF THE DRAWINGS

FIG. 13 is a table for showing an example of control group data.

FIG. 14 is a table for showing an example of processing time data.

FIG. 15 is a table for showing an example of scan group data.

FIG. 18 is a table for showing an example of control group data.

FIG. 19 is a table for showing an example of rungs including write processing and reference processing to be performed on a register.

DESCRIPTION OF THE EMBODIMENTS

1. First Embodiment

A first embodiment of the present disclosure, which is an example of an embodiment of a production system according to the present disclosure, is now described.

1-1. Overall Configuration of Production System

Figure 1:
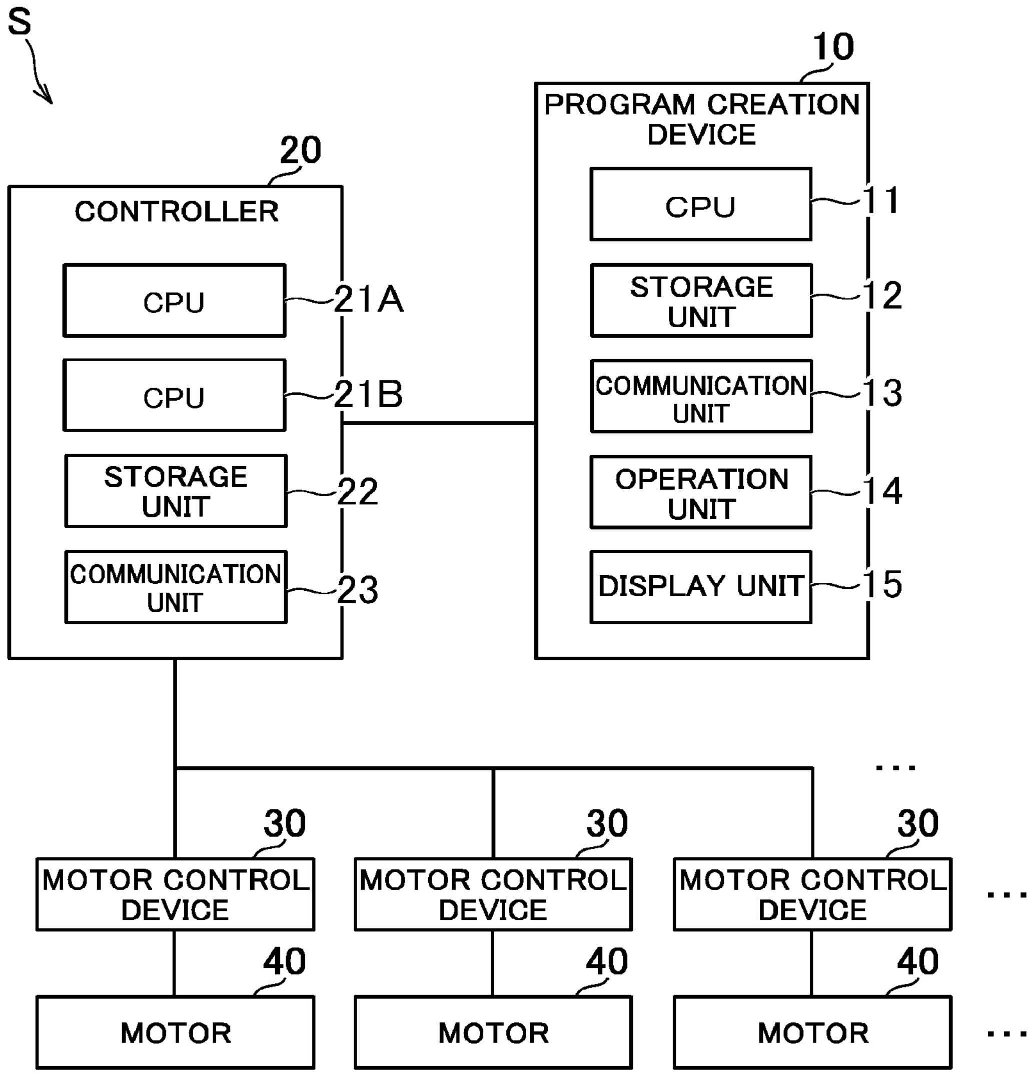
FIG. 1 is a diagram for illustrating an example of an overall configuration of a production system.

FIG. 1 is a diagram for illustrating an example of an overall configuration of a production system. For example, a production system S includes a program creation device 10, a controller 20, motor control devices 30, and motors 40. The program creation device 10, the controller 20, and the motor control devices 30 are communicably connected to each other via a network, such as an industrial network or a local area network (LAN).

The program creation device 10 is a device which creates a program for the controller 20 to control the motor control devices 30. In the first embodiment, there is described a case in which a personal computer operated by a user corresponds to the program creation device 10, but the program creation device may be another device. For example, the program creation device 10 may be a tablet terminal, a smartphone, or a server computer.

For example, the program creation device 10 includes a CPU 11, a storage unit 12, a communication unit 13, an operation unit 14, and a display unit 15. The CPU 11 is a processor including one or more processor cores. The storage unit 12 includes at least one of a volatile memory or a nonvolatile memory. The communication unit 13 includes at least one of a communication interface for wired communication or a communication interface for wireless communication. The operation unit 14 is an input device, such as a mouse or a keyboard. The display unit 15 is a liquid crystal display or an organic EL display.

The controller 20 is a device which controls one or more motor control devices 30. For example, the controller 20 is a machine controller. The controller 20 may be any device which can directly or indirectly control a physical mechanism, such as a motor or a belt, and is not limited to a machine controller. For example, the controller 20 may be a PLC, a robot controller, a line controller which manages a line, or a cell controller which manages a unit referred to as a cell that is smaller than a line. The motor control device 30 may correspond to the controller in the present disclosure.

For example, the controller 20 includes a CPU 21A, a CPU 21B, a storage unit 22, and a communication unit 23. In the first embodiment, an example in which the CPUs 21A and 21B are single-core processors (processors including one processor core) is given. Thus, the controller 20 in the first embodiment includes a total of two processor cores. When the CPUs 21A and 21B are not distinguished, those CPUs are hereinafter simply referred to as "CPU 21." The CPU 21 is a type of circuitry. The physical configurations of the storage unit 22 and the communication unit 23 may be the same as the physical configurations of the storage unit 12 and the communication unit 13, respectively.

It is sufficient for the controller 20 to include two or more processor cores, and the controller 20 may include three or more processor cores. It is sufficient for each CPU 21 to include one or more processor cores, and each CPU 21 may be a multi-core processor (processor including two or more processor cores). It is sufficient for the controller 20 to include one or more CPUs 21, and the controller 20 may include only one multi-core CPU 21, or may include three or more CPUs 21. That is, the two or more processor cores included in the controller are not required to be separated into separate circuits.

When the controller 20 includes a plurality of CPUs 21, the numbers of processor cores of the plurality of CPUs 21 may be different from each other. For example, one CPU 21 may include one core, and another CPU 21 may include three cores. The controller 20 may include both a single-core CPU 21 and a multi-core CPU 21. The processor core may be included in a processor referred to by a name other than CPU (for example, MPU).

Each of the motor control devices 30 is a device which controls a voltage to be applied to the motor 40 connected via a power line. The motor control device 30 is sometimes referred to as "servopack" (trademark) or "servo amplifier." The motor control device 30 is capable of communicating to and from the controller 20. Communication between the controller 20 and the motor control device 30 may be periodic communication or non-periodic communication. A sensor, such as a motor encoder or a torque sensor, may be connected to the motor control device 30. The sensor may be connected to the controller 20.

At least one of the programs or data stored in each device may be supplied through the network. Moreover, the hardware configuration of each device is not limited to the above-mentioned example, and various types of hardware can be applied. For example, a reading unit (for example, memory card slot) for reading a computer-readable information storage medium and an input/output unit (for example, USB terminal) for connecting to an external device may be included. In this case, at least one of programs or data stored in the information storage medium may be supplied through the reading unit or the input/output unit. Moreover, a circuit called "FPGA" or "ASIC" may be included.

1-2. Outline of First Embodiment

In the first embodiment, the controller 20 can be operated based on a ladder program. A ladder program is a program created in a ladder language. For example, the user creates a ladder program by using an engineering tool installed in the program creation device 10. In the first embodiment, a program before compilation (a ladder diagram that the user can understand visually) is called a ladder program, but a program after compilation (a program converted into a machine language) may also be referred to as a ladder program.

Figure 2:
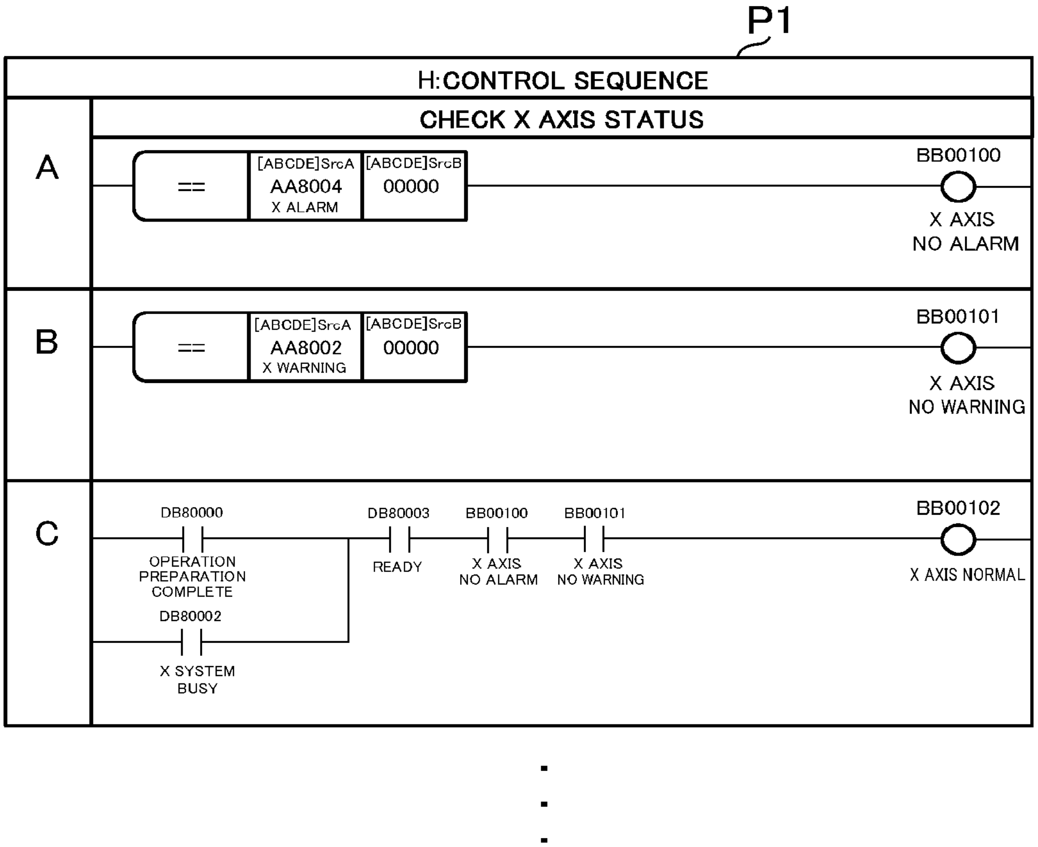
FIG. 2 is a diagram for illustrating an example of a ladder program.

FIG. 2 is a diagram for illustrating an example of a ladder program. For example, a ladder program P1 includes one or more rungs. A rung is a row in the ladder program P1. The user creates the ladder program P1 by arranging graphics such as coils, character strings representing commands, and character strings representing comments in rungs. As the method of creating the ladder program P1 itself, various publicly known methods can be used. The user can create not only a ladder program P1 corresponding to a main routine but also a ladder program P1 corresponding to a subroutine.

For example, the ladder program P1 includes processing to be performed on a register of the controller 20. Thus, each rung may include processing to be performed on the register of the controller 20. The register is a storage area of the controller 20. The processing to be performed on the register includes write processing of writing to the register and reference processing of referring to the register. Write processing is processing of writing a value to the register. Reference processing is processing of referring to a value held in the register. The processing itself to be performed on the register may be expressed by graphics and commands defined in a publicly known ladder language.

When all the processing of a ladder program P1 is executed by only the CPU 21A in order, it takes a long time for the processing to be executed because all the processing is executed by one processor core. However, by distributing the processing between the CPUs 21A and 21B, the time required for the processing can be reduced. Thus, in the first embodiment, the user performs programming for executing distributed processing. For example, when an engineering tool installed in the program creation device 10 is started, a program creation screen is displayed on the display unit 15.

Figure 3:
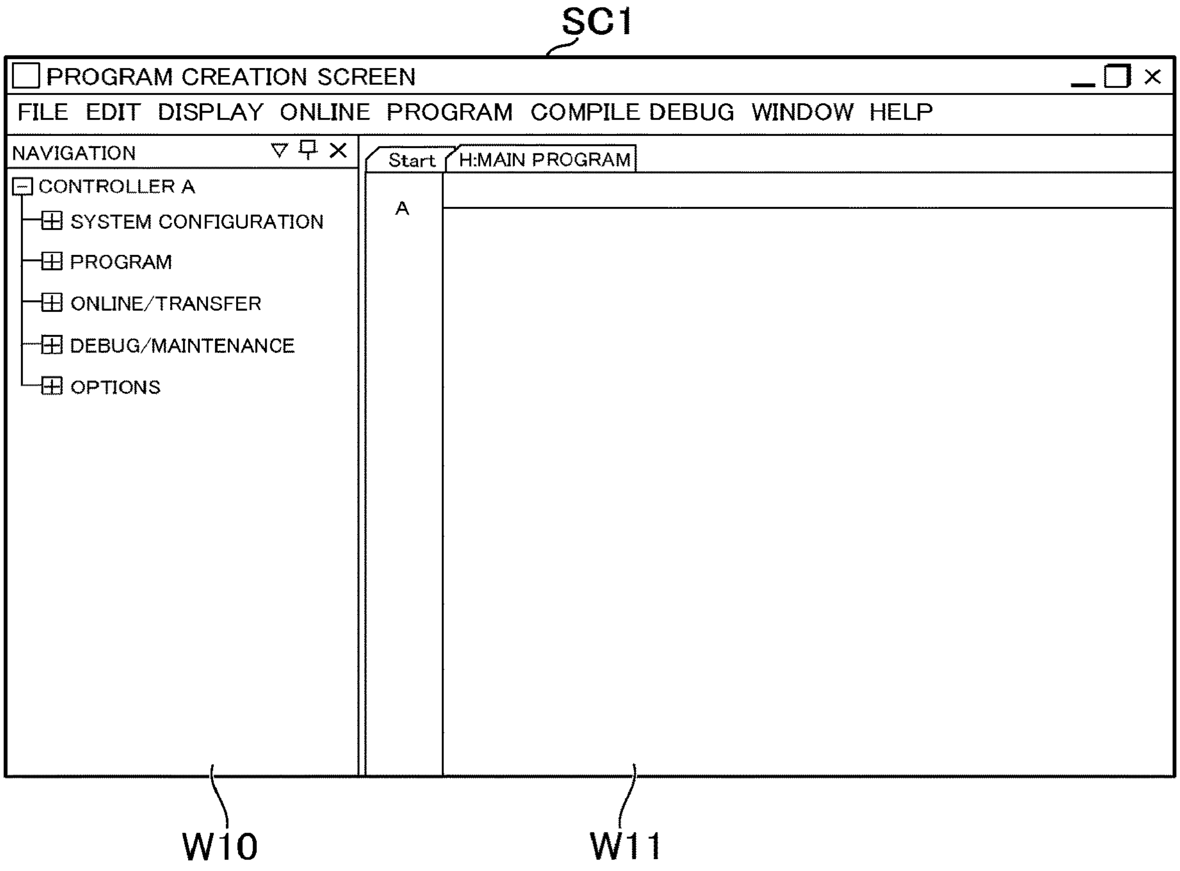
FIG. 3 is a diagram for illustrating an example of a program creation screen.

FIG. 3 is a diagram for illustrating an example of the program creation screen. For example, a program creation screen SC1 includes a navigation window W10 for presenting programming guidance and a work window W11 for the user to perform work. Using the navigation window W10 as a starting point, the user performs programming in order of: (Procedure 1) Create module configuration; (Procedure 2) Create scan group; (Procedure 3) Set variables and comments; (Procedure 4) Create ladder program P1; and (Procedure 5) Set scan group.

Procedure 1: Create Module Configuration

For example, the user selects "system configuration" in the navigation window W10, and creates a module configuration. The module configuration is the physical configurations in the production system S. For example, the user inputs information on the physical configurations including the controller 20, the motor control device 30, the motor 40, I/O devices, and other peripheral devices. The motor 40 may be hereinafter referred to as "axis." The user inputs the name of the CPU 21 and the name of the processor core as the module configuration.

Procedure 2: Create Scan Group

For example, the user selects "scan group" from the "Program" tree in the navigation window W10, and creates a scan group. A scan group is a set of programs (applications) which are executed in a predetermined execution cycle. For example, one or more ladder programs P1 are associated with the scan group. Programs other than the ladder program P1 may be associated with the scan group. For example, when the user starts Procedure 2, a new creation screen for creating a scan group is displayed on the display unit 15.

Figure 4:
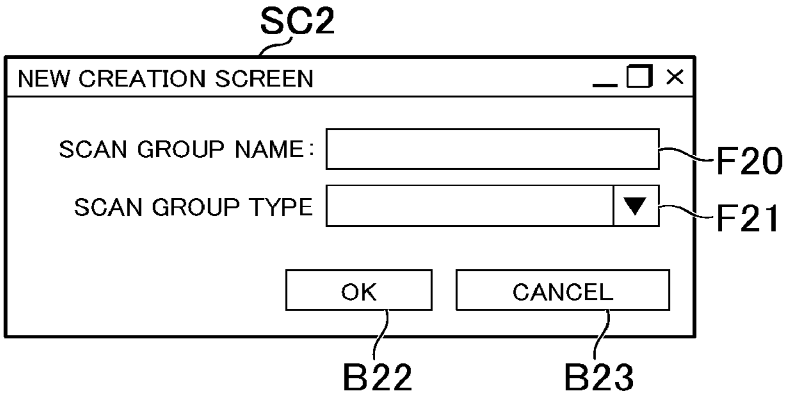
FIG. 4 is an example of a new creation screen.

FIG. 4 is an example of the new creation screen. For example, when the user inputs the name and the type of a scan group into input forms F20 and F21 and selects a button B22, a new scan group can be created. When the user selects a button B23, creation of a new scan group can be canceled. The user can also create the ladder program P1 while suspending the creation of the scan group. In this case, the ladder program P1 is not required to be associated with a scan group.

In the first embodiment, separately from the scan group, the user can specify a control group. A control group is a set of physical configurations that are synchronized with each other. In the first embodiment, there is described a case in which a set of mutually synchronized axes corresponds to a control group, but the control group may also be a set of other configurations such as I/O devices. For example, when the user performs an operation to define a control group from the program creation screen SC1, a control group definition screen is displayed on the display unit 15.

Figure 5:
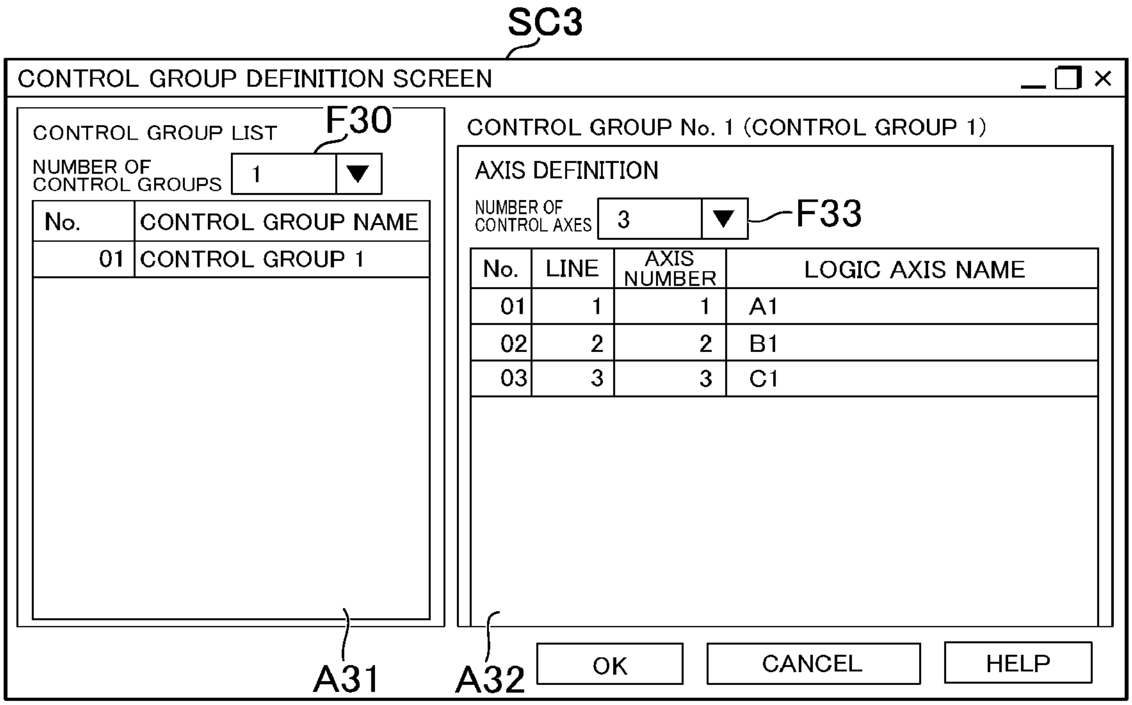
FIG. 5 is a diagram for illustrating an example of a control group definition screen.

FIG. 5 is a diagram for illustrating an example of the control group definition screen. For example, the user inputs the number of control groups in the production system S to an input form F30. A list of control groups is displayed in a display area A31. The user inputs the name of the control group into the display area A31. When the user specifies a control group from within the display area A31, the axis belonging to the specified control group can be defined from a display area A32.

For example, the user inputs the number of axes belonging to the control group into an input form F33. A list of axes belonging to the control group is displayed in the display area A32. The user inputs, into the display area A32, axis information (in the example of FIG. 4, line, axis number, and logic axis name) from which each axis can be identified. When a plurality of control groups are created, the user inputs the axis information for each control group by using the same procedure. Definition of the control group may be executed within Procedure 2, or may be executed as a separate procedure different from Procedure 2.

Procedure 3: Set Variables and Comments

For example, the user selects "Set variables and comments" from the "Program" tree in the navigation window W10, and sets variables and comments. Variables are pieces of information on which the write processing or the reference processing by the ladder program P1 are executed. For example, the user sets various variables, such as a variable for controlling an axis or a variable indicating a physical quantity detected by a torque sensor or the like. As the method of setting the variables and the comments itself, publicly known method can be used.

Procedure 4: Create Ladder Program

For example, the user creates the ladder program P1 from the work window W11. As the method of creating the ladder program P1 itself, a publicly known method can be used. For example, the user creates one or more rungs on the work window W11. The user arranges elements, for example, graphics such as coils and comments for each rung. The user can create a ladder program P1 having a hierarchical structure.

Procedure 5: Set Scan Group

For example, the user sets the details of the scan group from the navigation window W10 of the program creation screen SC1. In Procedure 5, the user performs various settings, such as specification of the execution cycle of the scan group, specification of an association between the scan group and the control group, specification of an association between the scan group and the ladder program P1, and specification of the allocation of the scan group and the processor cores. In the first embodiment, a processing time screen and an associated rung screen are prepared as support for Procedure 5.

Figure 6:
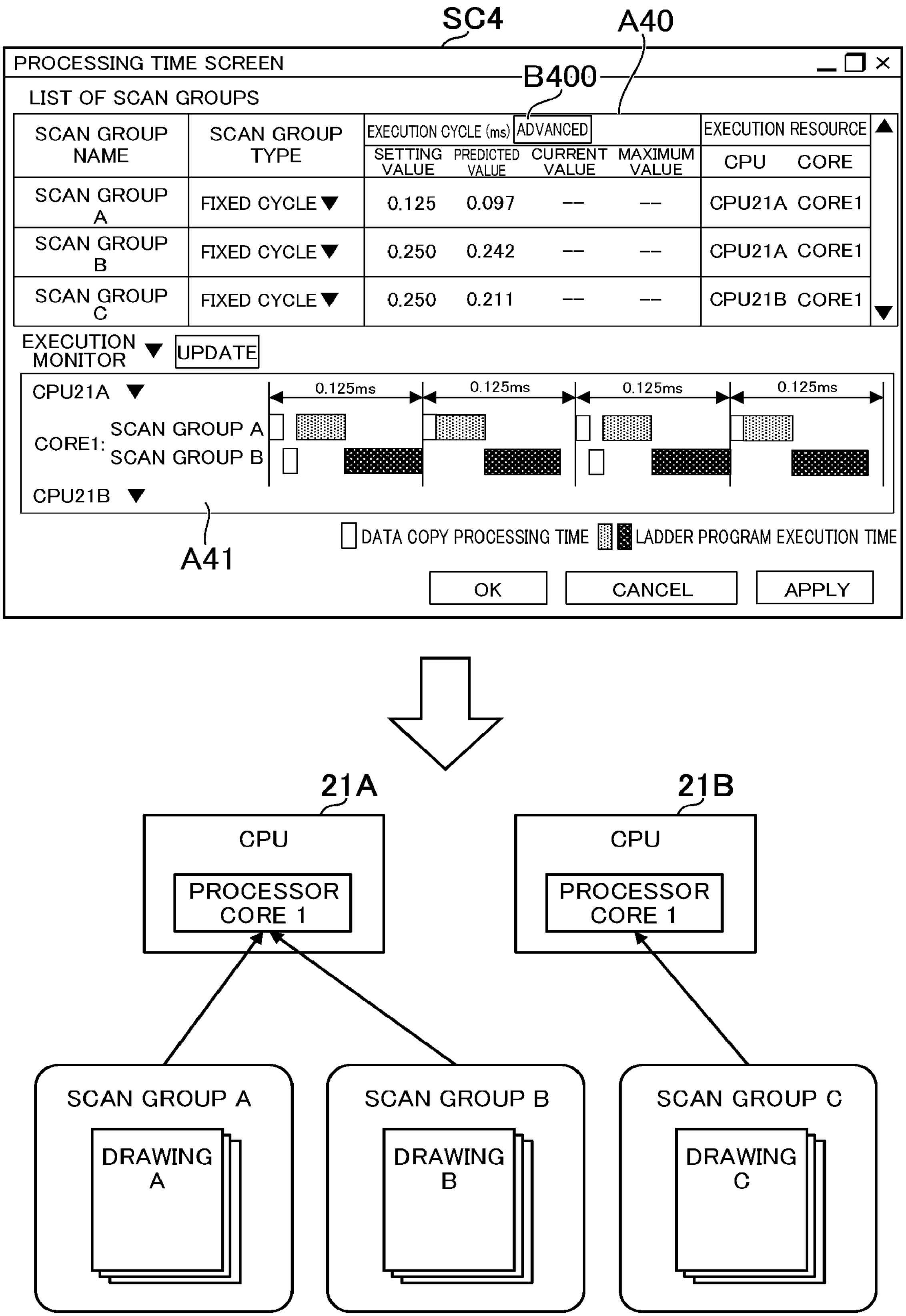
FIG. 6 is a diagram for illustrating an example of a processing time screen.

FIG. 6 is a diagram for illustrating an example of the processing time screen. For example, created scan groups are displayed in a display area A40 of a processing time screen SC4. In the example of FIG. 6, three scan groups have been created. The user specifies the execution cycle of the scan groups from the display area A40. In the first embodiment, it is assumed that the user can specify any numerical value as the execution cycle. At least one of an upper limit value or a lower limit value of the numerical values that can be specified as the execution cycle may be determined.

For example, the user specifies, from the display area A40, the processor core to which each scan group is to be allocated. As used herein, "allocate" means specifying the processor core which executes the ladder program(s) P1 associated with the scan group. The user specifies the processor core to which a scan group is to be allocated from among the processor cores defined in the module configuration of Procedure 1. The user can also change the type of the scan group from the display area A40. For example, the user can change a fixed-cycle scan group to a non-fixed-cycle scan group.

In the example of FIG. 6, for a scan group A, the user specifies the execution cycle "0.125 ms" and the processor core of the CPI 21A. For a scan group B, the user specifies the execution cycle "0.250 ms" and the processor core of the CPI 21A. For a "scan group C," the user specifies the execution cycle "0.250 ms" and the processor core of the CPI 21B.

For example, a predicted value of the processing time of the scan group is displayed in the display area A40. When a plurality of ladder programs P1 are associated with a scan group, a predicted value of the overall processing time of the plurality of ladder programs P1 is displayed in the display area A40. For example, when the user selects a button B400, the display in the display area A40 changes to a display showing the processing time for each ladder program P1 associated with the scan group.

Figure 7:
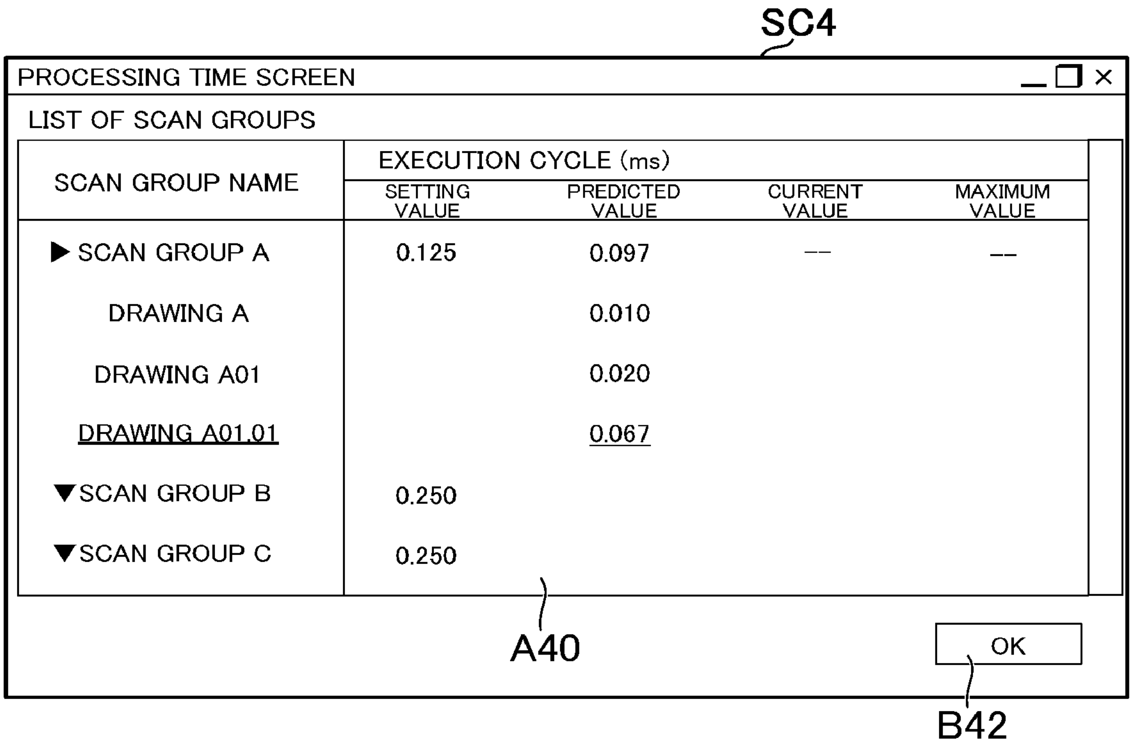
FIG. 7 is a diagram for illustrating an example of a processing time screen displaying a processing time for each ladder program.

FIG. 7 is a diagram for illustrating an example of the processing time screen SC4 on which the processing time for each ladder program P1 is displayed. For example, on the processing time screen SC4, for each ladder program P1 associated with a scan group, a predicted value of the processing time of the ladder program P1 is displayed. When the user opens the scan group tree in the display area A40, the processing time of the ladder program(s) P1 associated with the scan group is displayed.

In the example of FIG. 7, the scan group A is associated with three ladder programs P1, namely, "Drawing A," "Drawing A01," and "Drawing A01.01." The predicted value "0.067 ms" of the processing time for "Drawing A01.01" takes up more than half of the execution cycle of "0.125 ms," and is therefore highlighted. The highlighted display as illustrated in FIG. 7 makes it easier for the user to notice a ladder program P1 having a long processing time. When the user selects a button B42, the processing returns to the processing time screen SC4 of FIG. 6.

As illustrated in FIG. 6, the processing time for each scan group is displayed in a time chart format in the display area A41. For example, a time axis is set in the horizontal direction of the display area A41, and the processor cores and the scan groups are arranged in the vertical direction of the display area A41. In the example of FIG. 6, the processing times of the scan group A and scan group B allocated to the processor core of the CPU 21A are displayed.

For example, in a scan group, at the start of an execution cycle, data copy processing for copying data between scan groups is executed. After that, the ladder programs P1 associated with the scan group are executed. Thus, as illustrated in FIG. 6, patterned rectangles indicating the processing time of the ladder programs P1 are displayed after white rectangles indicating the processing time of the data copy processing. In the example of FIG. 6, the width of the rectangles corresponds to the processing time. As the processing time becomes longer, the width of the rectangle becomes longer.

For example, when a plurality of scan groups are allocated to one processor core, the ladder programs P1 of the scan groups are executed in ascending order of the execution cycle. In the example of FIG. 6, the execution cycle of the scan group A is shorter than the execution cycle of the scan group B, and hence, after the data copy processing of the scan group A is executed, the data copy processing of the scan group B is executed. Then, the ladder programs P1 of the scan group A are executed. After that, the ladder programs P1 of the scan group B are executed.

For example, the user sets the scan groups by referring to the processing time screen SC4. When there is a scan group for which there is not enough time, the user may be required to significantly change the ladder program P1. In this case, it is very time-consuming for the user to recreate the ladder program P1 from the beginning. Thus, in the first embodiment, the user can divide a part of the ladder program P1. Further, the division of the ladder program P1 can be supported by using an associated rung screen, which is described below.

Figure 8:
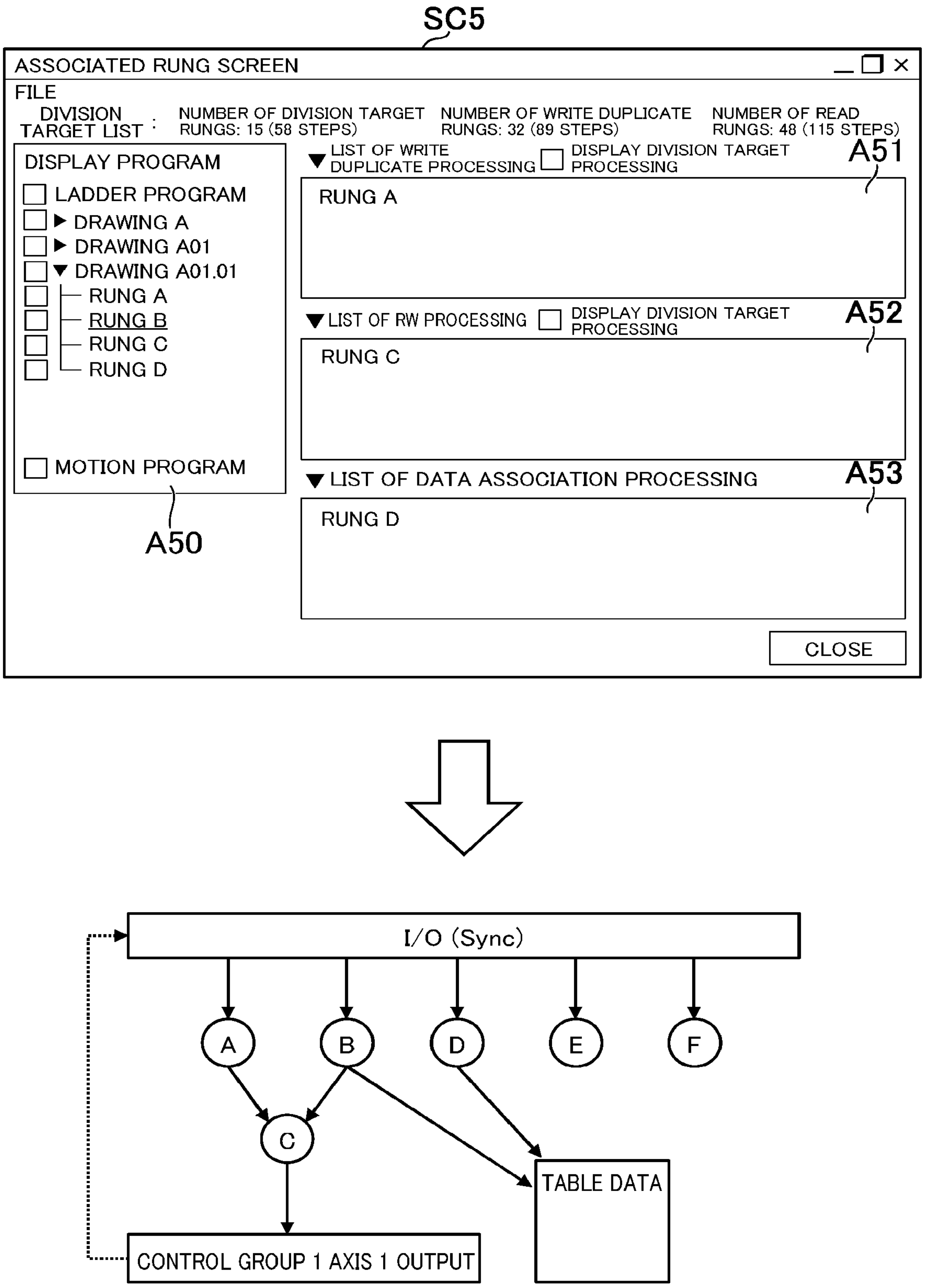
FIG. 8 is a diagram for illustrating an example of an associated rung screen.

FIG. 8 is a diagram for illustrating an example of an associated rung screen SC5. For example, the associated rung screen SC5 is displayed on the display unit 15 when the user performs an operation to display the associated rung screen SC5 from the program creation screen SC1. Before the associated rung screen SC5 is displayed, selection of an axis to be displayed and creation of a new scan group may be performed. For example, in a display area A50 of the associated rung screen SC5, a list of associated rungs having an association with the axis selected by the user is displayed.

In FIG. 8, relations among rungs A to F included in the "Drawing A01.01" are illustrated. For example, when data copy processing (in FIG. 8, "I/O (Sync)") is executed, the rungs A, B, D, E, and F refer to the register in which data copy processing has been completed. The rungs A and B include write processing to be performed on the same register as each other. The rung C includes reference processing on this register. Thus, the rungs A to C are identified as associated rungs having an association with each other. The rung C includes write processing of the register corresponding to an axis 1. The rungs directly related to control of the axis 1 are the rungs A to C.

For example, the rungs B and D include output processing for the same table data. Thus, the rungs B and D are identified as associated rungs having an association with each other. The rungs E and F have no association with other rungs. In the display area A50, the rungs A to D that have some sort of association with other rungs are displayed. When the user selects a rung from the display area A50, other rungs that have an association with the selected rung are displayed in display areas A51 to A53.

For example, when the user selects the rung B from the display area A50, the rung A, which includes write processing to be performed on the same register as the rung B, is displayed as an associated rung of the rung B in the display area A51. The rung C, which includes reference processing of the register written by the write processing of the rung B, is displayed as an associated rung of the rung B in the display area A52. The rung D, which includes output processing to be performed on the same table data as the rung B, is displayed in the display area A53. The user divides the "Drawing A01.01" by referring to the associated rung screen SC5.

Figure 9:
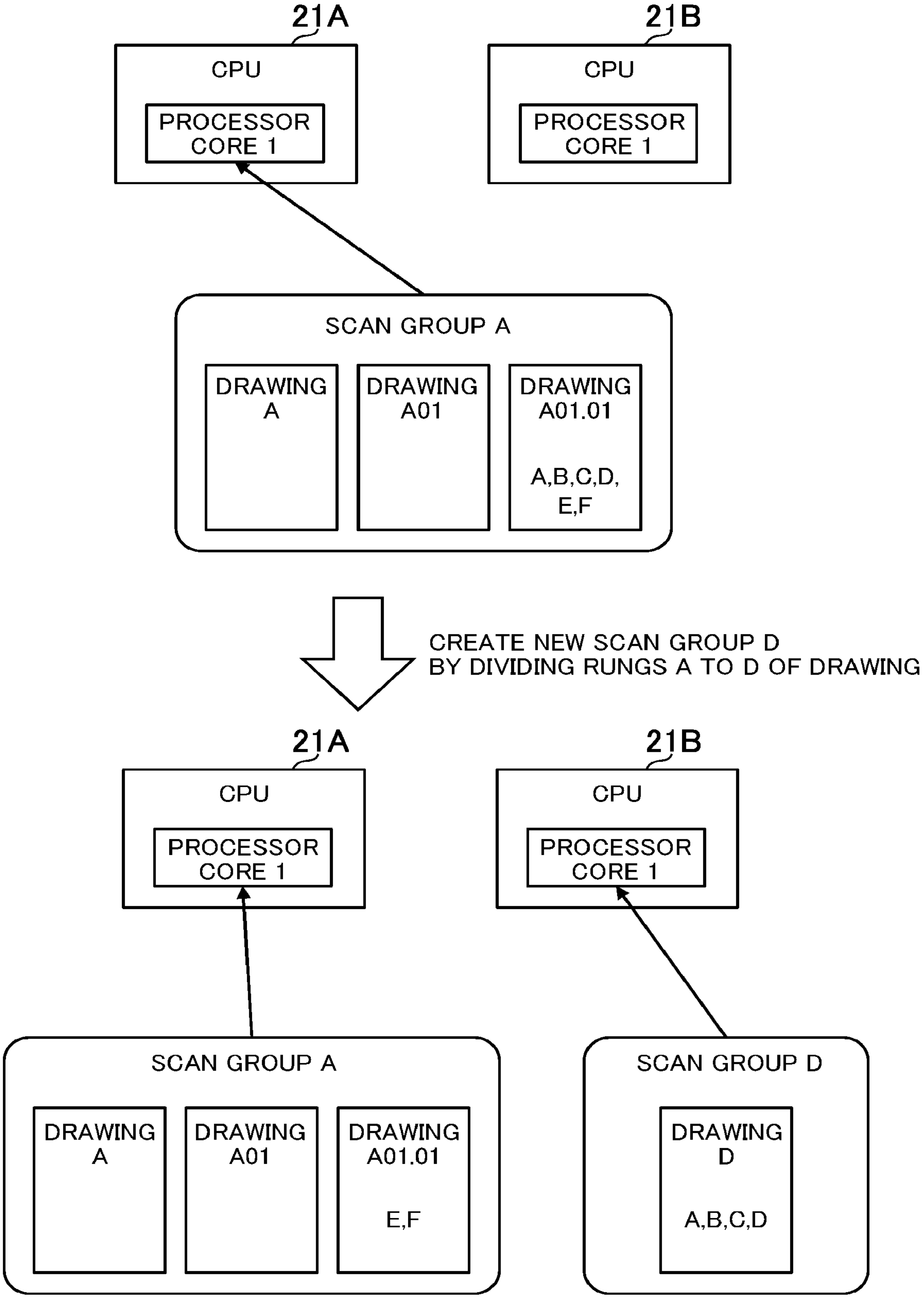
FIG. 9 is a diagram for illustrating an example of processing of dividing a "drawing A01.01."

FIG. 9 is a diagram for illustrating an example of the processing of dividing the "Drawing A01.01." For example, the user divides the "Drawing A01.01" so that the associated rungs having an association with each other are associated with the same scan group. In the example of FIG. 9, the rungs A to D have some sort of association with each other, and hence the user copies the rungs A to D to a "Drawing D" of a newly created scan group D. The rungs A to D may remain in the copy source "Drawing A01.01."

For example, the user allocates the scan group D to the processor core of the CPU 21B. As a result, a part of the rungs A to D of the "Drawing A01.01," which took a long time to process, can be allocated to another processor core. The processing time of the "Drawing A01.01" is shortened, and hence the processing of the scan group A can be reliably completed within the execution time. Further, by having the same processor core perform the processing for the rungs A to D, which have an association with each other, the processing of the rungs A to D can be executed accurately.

For example, for scan groups B and C as well, the user can similarly divide the ladder programs P1 as required. The user can also divide a ladder program P1 that is not associated with a scan group and associate the divided ladder program P1 with a scan group. In the first embodiment, when a ladder program P1 is to be divided, the register is automatically replaced based on a replacement setting specified by the user so that the register of the division source corresponds to the division destination.

Figure 10:
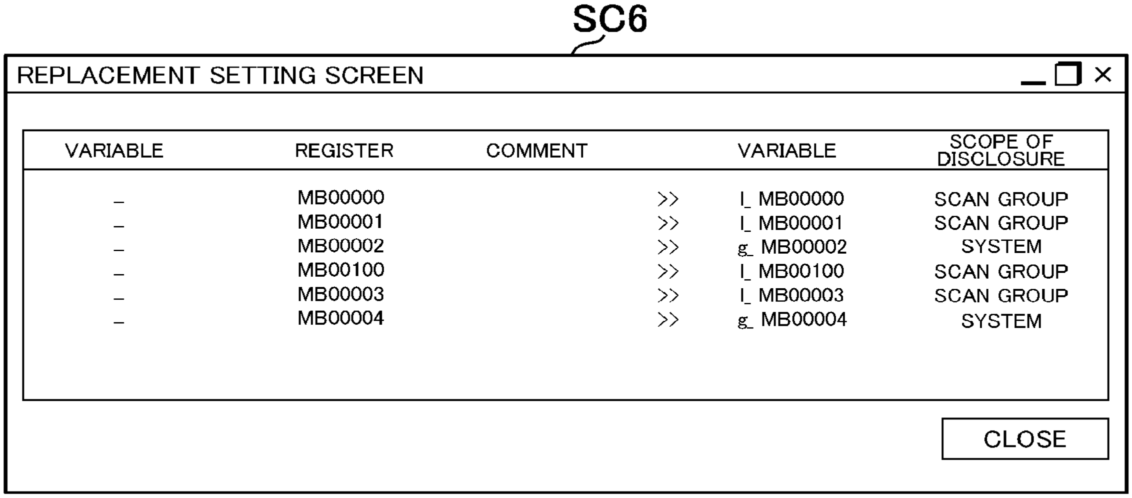
FIG. 10 is a diagram for illustrating an example of a replacement setting screen.

FIG. 10 is a diagram for illustrating an example of a replacement setting screen. For example, when a user performs an operation for performing a replacement setting from the program creation screen SC1, a replacement setting screen SC6 is displayed on the display unit 15. For example, the user can specify a relationship between the register of the division source and the register of the division destination (in the example of FIG. 10, a variable name) from the replacement setting screen SC6. When the user divides the ladder program P1, the register is replaced based on the replacement setting specified in FIG. 10.

In the first embodiment, the user can create not only the ladder program P1 but also a motion program from the engineering tool. A motion program is a program created in a language other than the ladder language. The motion program may be associated with a scan group. For example, when the user performs an operation for creating a motion program from the program creation screen SC1, an associated portion screen for displaying an associated portion of the motion program is displayed on the display unit 15.

Figure 11:
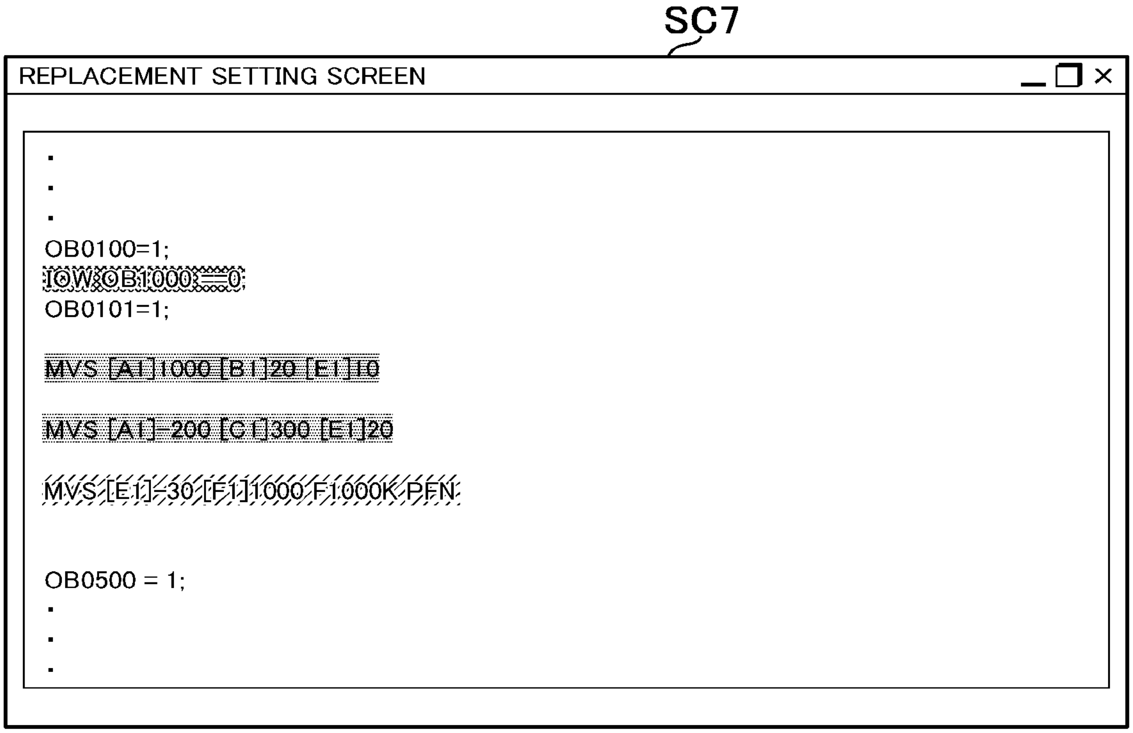
FIG. 11 is a diagram for illustrating an example of an associated portion screen.

FIG. 11 is a diagram for illustrating an example of an associated portion screen. For example, a code of the motion program is displayed on an associated portion screen SC7. The code of the motion program is input as a character string. In the first embodiment, among the motion programs, associated codes having an association with each other are highlighted. In the example of FIG. 11, a code relating to control of an axis and a code in which processing occurs at a certain time before that are highlighted. The user can easily confirm the temporal relationship from the associated portion screen SC7.

As described above, the production system S of the first embodiment uses an engineering tool to effectively support programming by the user so as to be capable of reducing the time and effort required for programming. Details of the production system S of the first embodiment are described below.

1-3. Functions Implemented in First Embodiment

Figure 12:
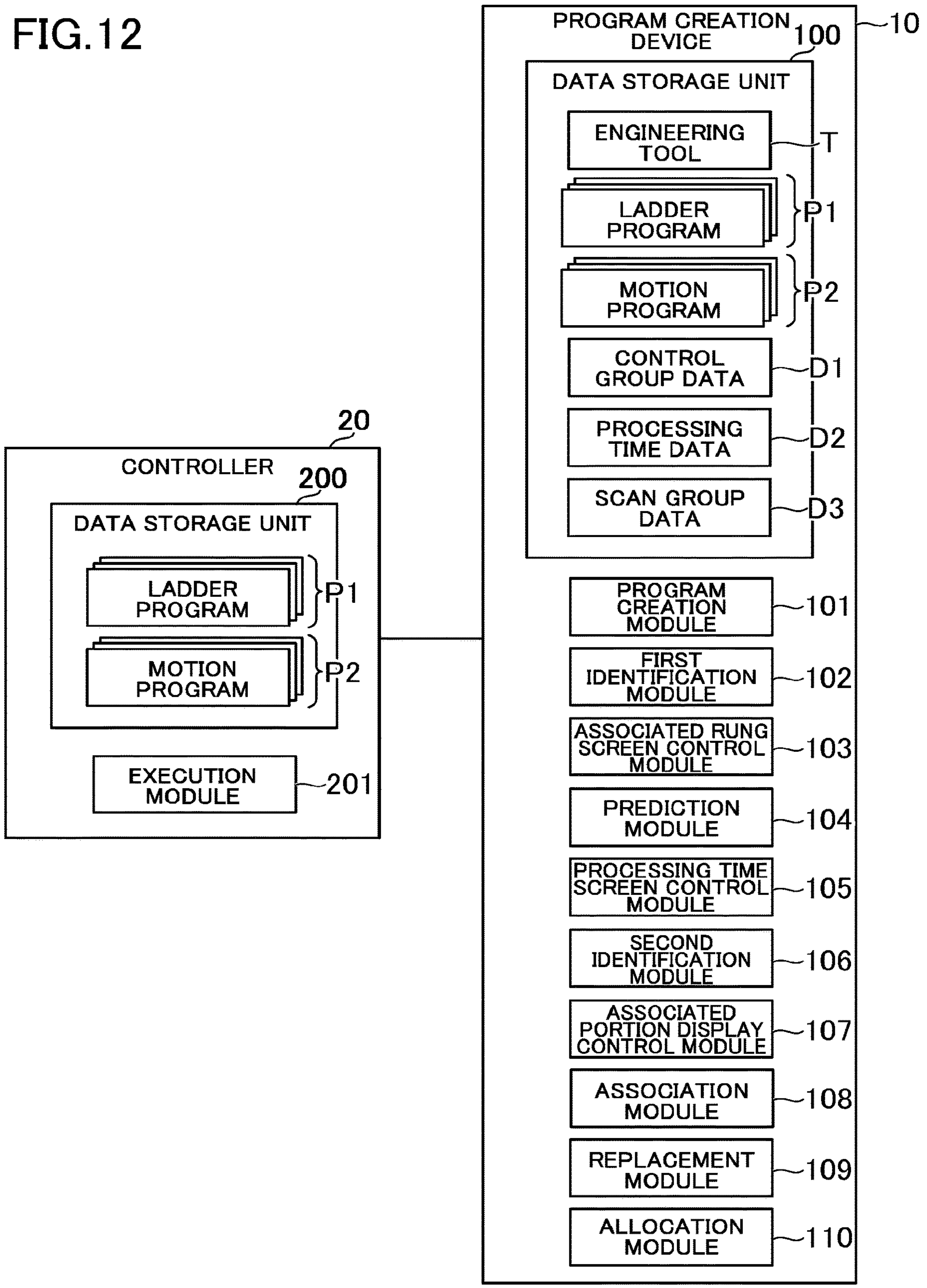
FIG. 12 is a function block diagram for illustrating an example of functions of the production system.

FIG. 12 is a function block diagram for illustrating an example of functions of the production system S.

1-3-1. Functions of Program Creation Device

The program creation device 10 includes a data storage unit 100, a program creation module 101, a first identification module 102, an associated rung screen control module 103, a prediction module 104, a processing time screen control module 105, a second identification module 106, an associated portion display control module 107, an association module 108, a replacement module 109, and an allocation module 110. The data storage unit 100 is implemented by the storage unit 12. The other functions are implemented by the CPU 11.

[Data Storage Unit]

The data storage unit 100 stores data required for program creation. For example, the data storage unit 100 stores an engineering tool T, ladder programs P1, motion programs P2, control group data D1, processing time data D2, and scan group data D3. Details of the engineering tool T, ladder programs P1, and motion programs P2 are as described above.

FIG. 13 is a table for illustrating an example of the control group data D1. The control group data D1 is data which defines a control group. As described above, in the first embodiment, a control group is a set of axes to be synchronized. In the controller 20, a register (hereinafter referred to as "output register") for storing an output-related value is prepared for each axis, and hence a control group can also be referred to as a set of output registers requiring synchronization. The output register corresponding to each axis is hereinafter referred to as "axis output."

In the first embodiment, there is described a case in which the user specifies the axes to be synchronized from the engineering tool T, but it is not required that the axes to be synchronized be specified by the user. For example, the axes to be synchronized may be automatically set based on a control cycle set for each axis so that axes having the same control cycle belong to the same control group. Further, for example, a person other than the user operating the engineering tool T may specify the axes to be synchronized.

In the example of FIG. 13, control groups 1 to 3 exist. Axes 1 to 3 belong to the control group 1. Axes 4 to 7 belong to the control group 2. Axes 8 to 10 belong to the control group 3. The control group data D1 includes register identification information that can identify the axis outputs of the axes 1 to 3 belonging to the control group 1, register identification information that can identify the axis outputs of the axes 4 to 7 belonging to the control group 2, and register identification information that can identify the axis outputs of the axes 8 to 10 belonging to the control group 3. For example, the register identification information is an address (register number) of the register or a name of the register.

The information included in the control group data D1 is not limited to the example of FIG. 13. It is sufficient that the control group data D1 include information on the control group. For example, when another output register other than an axis output (for example, an I/O output register) serves as the reference of the control group, register identification information on the another output register may be included in the control group data D1. Further, the number of control groups may be one, or three or more. The number of axes included in each control group may also be any number.

FIG. 14 is a table for showing an example of the processing time data D2. The processing time data D2 is data which defines a standard processing time required for the processing that can be executed in the ladder language. For example, a standard processing time is defined in the processing time data D2 for each element such as a graphic or a command in the ladder diagram. That is, a processing time is defined for each element that can be included in each rung. The processing time may be an actual value or a value calculated from a simulation. The processing time may be specified by the user, or may be specified by the creator of the engineering tool T. The processing time may be a value that takes into account the performance of the CPUs 21A and 21B, or may be a value that is based on general performance.

FIG. 15 is a table for showing an example of the scan group data D3. The scan group data D3 is data which defines a scan group. For example, the name of the scan group, the type of the scan group, the name of the control group associated with the scan group, the execution cycle of the scan group, the processor core to which the scan group is allocated, and the name(s) of the ladder program(s) P1 associated with the scan group are stored in the scan group data D3.

For example, when the user creates a new scan group by using the engineering tool T, the data of the newly created scan group is added to the scan group data D3. When the user changes the type or the execution cycle of a scan group, the changed type or execution cycle is stored in the scan group data D3. When the motion program P2 is associated with a scan group, the name of the motion program P2 is stored in the scan group data D3.

In the first embodiment, to simplify the description, there is described a case in which one control group belongs to one scan group, but a plurality of control groups may belong to one scan group. Conversely, one control group may belong to a plurality of scan groups. Further, the concept of a "control group" may not particularly exist, and only the concept of a "scan group" may exist.

The data stored in the data storage unit 100 is not limited to the above-mentioned example. For example, the data storage unit 100 may store other data, such as register definition data indicating the definition of the register of the controller 20 and communication setting data indicating a communication setting between the controller 20 and the motor control device 30. The configurational relationship between the axis outputs and other registers is assumed to be defined in the register definition data. The user can also define the register and configure the communication setting by using the engineering tool.

[Program Creation Module]

The program creation module 101 creates the programs to be executed by the controller 20. For example, the program creation module 101 creates a ladder program P1. The program creation module 101 creates a ladder program P1 based on graphics such as coils input to the work window W11 of the program creation screen SC1, and records the created ladder program P1 in the data storage unit 100. The program creation module 101 may compile a ladder program P1, and record the compiled ladder program P1 in the data storage unit 100. The program creation module 101 also creates other programs, for example, the motion programs P2, in addition to the ladder programs P1.

[First Identification Module]

The first identification module 102 identifies a plurality of associated rungs having an association with each other by analyzing a ladder program P1. A rung includes one or more types of processing. For example, each element such as a coil described in the rank corresponds to a type of processing. The first identification module 102 analyzes at least a part of the processing in the rung. The first identification module 102 analyzes the elements included in each rung, and identifies associated rungs.

As used herein, "relation" means that the processing of a certain rung and the processing of another rung are related to each other. For example, when the completion of the execution of the processing of another rung is required in order to execute the processing of a certain rung, those rungs have a relation. For example, when the processing of a certain rung refers to the result of the execution of the processing of another rung, those rungs have a relation. For example, when it is more efficient to use the same processor core to execute the processing of a certain rung and the processing of another rung, those rungs have a relation.

In the example of FIG. 8, the rung A includes reference processing on a register 1 and write processing on a register 2. The rung B includes reference processing on a register 3, write processing on the register 2, and output processing to be performed on table data. The rung C includes reference processing on the register 2 and write processing on a register 4. The register 4 is the axis output of the axis 1. For example, the rung D includes reference processing on a register 5 and output processing to be performed on table data. The rung E includes reference processing on a register 6. The rung F includes reference processing on a register 7.

In the first embodiment, the first identification module 102 identifies a plurality of rungs in which processing on the same register occurs as a plurality of associated rungs having an association with each other. For example, when a certain first rung includes processing to be performed on a certain register and another second rung includes processing to be performed on the same register, the first identification module 102 identifies that the first rung and the second rung have an association with each other. The first identification module 102 identifies the first rung and the second rung as a plurality of associated rungs.

For example, the first identification module 102 may identify, as a plurality of associated rungs, a plurality of rungs in which write processing on the same register occurs. In the example of FIG. 8, the rung A and the rung B include write processing on the same register 2. Thus, the first identification module 102 identifies the rung A and the rung B as a plurality of associated rungs.

For example, the first identification module 102 may identify, as a plurality of associated rungs, a plurality of rungs in which write processing and reference processing on the same register occur. In the example of FIG. 8, the rungs A and B include write processing on the register 2, and the rung C includes reference processing on the same register 2. Thus, the first identification module 102 identifies the rungs A and B and the rung C as a plurality of associated rungs.

For example, the first identification module 102 may identify, as a plurality of associated rungs, a plurality of rungs in which processing on the same data occurs. In the example of FIG. 8, the rungs B and D include output processing to be performed on the same table data. Thus, the first identification module 102 identifies the rung B and the rung D as a plurality of associated rungs. The first identification module 102 may identify, as a plurality of associated rungs, a plurality of rungs in which processing to be performed on data other than table data occurs.

For example, the first identification module 102 may identify a plurality of associated rungs that have an association with one or more axes selected by the user from among a plurality of axes controlled by the controller 20. In the example of FIG. 8, when the user selects the axis 1, the rungs that are directly related to the write processing and the reference processing on the register (axis output) corresponding to the axis 1 are identified as a plurality of rungs having an association with each other. The correspondence between the axes and registers is set in Procedure 3.

For example, the first identification module 102 may identify, as the plurality of associated rungs, rungs including, as an association, at least write processing which can be traced back to write processing on a register leading to an output to the one or more axes. In the example of FIG. 8, the user has selected the axis 1, and hence a plurality of associated rungs are identified by tracing the write processing on the register that ultimately leads to the output to the register (axis output) corresponding to the axis 1. The first identification module 102 identifies the rung C, in which direct processing on the register corresponding to the axis 1 occurs, and the rungs A and B having an association with the rung C, as a plurality of associated rungs. The first identification module 102 may also identify the rung D, which has as an association with the rung B, as an associated rung.

For example, the first identification module 102 may further identify, for one associated rung among the plurality of identified associated rungs, one or more associated rungs having a register or data to be processed in common with the one associated rung. The rung B of FIG. 8 includes output processing to be performed on the same table data as the rung D, and hence the first identification module 102 identifies the rung B and the rung D as a plurality of associated rungs. In this case, the rungs A and B have an association with the rung C, and hence the first identification module 102 may assume that all of the rungs A to D have an association with each other, and identify those four rungs as associated rungs.

The first identification module 102 may identify a relation between rungs by using information other than processing to be performed on the register or data. It is sufficient that the relation between rungs be determined based on a method determined in advance. For example, the first identification module 102 may determine that rungs have a relation with each other when a certain rung includes a command to call another rung or drawing.

[Associated Rung Screen Control Module]

The associated rung screen control module 103 displays the associated rung screen SC5 showing a plurality of associated rungs. For example, the associated rung screen control module 103 displays associated rungs having some sort of association in the display area A50. In the example of FIG. 8, the rungs A to D have some sort of association, and hence the associated rung screen control module 103 displays the rungs A to D in the display area A50.

In the first embodiment, there are three types of association, namely, an association indicating that write processing on the same register is to occur, an association indicating that write processing and reference processing on the same register are to occur, and an association indicating that processing on the same data is to occur. Thus, the associated rung screen control module 103 controls the display of the display areas A51 to A53 for each type of association.

For example, when the user selects an associated rung from the display area A50, the associated rung screen control module 103 displays in the display area A51 the other associated rungs that include write processing on the same register as the selected associated rung. In the example of FIG. 8, when the user selects the rung B from the display area A50, the associated rung screen control module 103 displays the rung A, which includes write processing on the same register as the rung B, in the display area A51.

For example, when the user selects an associated rung from the display area A50, the associated rung screen control module 103 displays in the display area A52 the other associated rungs that include reference processing on the register of the write processing included in the selected associated rung and the other associated rungs that include write processing on the register of the reference processing included in the selected associated rung. In the example of FIG. 8, when the user selects the rung B from the display area A50, the associated rung screen control module 103 displays the rung C, which includes reference processing on the same register as the write processing of the rung B, in the display area A52.

For example, when the user selects an associated rung from the display area A50, the associated rung screen control module 103 displays in the display area A53 the other associated rungs that include processing on the same data as the selected associated rung. In the example of FIG. 8, when the user selects the rung B from the display area A50, the associated rung screen control module 103 displays the rung D, which includes processing on the same data as the rung B, in the display area A53.

[Prediction Module]

The prediction module 104 predicts a processing time relating to the scan group allocated to each of the plurality of processor cores. For example, the prediction module 104 predicts at least one of the overall processing time of the scan groups or the processing time of the ladder programs P1 associated with the scan groups. In the first embodiment, there is described a case in which the prediction module 104 predicts both of those processing times, but the prediction module 104 may predict only one of those processing times.

For example, the prediction module 104 predicts the processing time based on the processing time data D2 and the scan group data D3. The prediction module 104 refers to the scan group data D3, and identifies the ladder programs P1 associated with each scan group. The prediction module 104 refers to the processing time data D2, and acquires a predicted value of the processing time associated with the elements in the ladder programs P1. The prediction module 104 predicts the processing time of the ladder programs P1 by calculating the total of the predicted values of the processing times. The prediction module 104 predicts the processing time of the scan group by calculating the total of the processing times of the ladder programs P1 associated with the scan group.

The method of predicting the processing time is not limited to the above-mentioned example. For example, the prediction module 104 may predict the processing time by executing a simulation of the ladder programs P1 associated with the scan group based on a simulator. As the simulator itself, a publicly known simulator can be used. For example, the prediction module 104 may predict the processing time by arranging a virtual controller 20 in a virtual space and operating the virtual controller 20 on a simulator.

For example, the prediction module 104 may identify, from among elements included in one scan group, an element that requires more processing time than the other elements. The element may be the ladder program P1 itself, or may be a rung unit. In addition, the element may be a part of the rung. The prediction module 104 identifies an element that requires a relatively more processing time from within a certain scan group. For example, the prediction module 104 may identify an element having a processing time which is equal to or more than a threshold value. The prediction module 104 may sort the elements in descending order of the processing time and identify the elements up to a predetermined rank. In the example of FIG. 7, the prediction module 104 identifies the "Drawing A01.01" as such an element because the processing time of the "Drawing A01.01" is equal to or more than the threshold value.

[Processing Time Screen Control Module]

The processing time screen control module 105 displays the processing time screen SC4 showing a relationship between the execution cycle and the processing time of each of the plurality of scan groups. In the example of FIG. 6, the processing time screen control module 105 displays the processing time screen SC4 showing the execution cycles of the scan groups and the overall processing time of the scan groups. In the example of FIG. 7, the processing time screen control module 105 displays the processing time screen SC4 showing the execution cycles of the scan groups and the processing time for each ladder program P1 associated with the scan groups.

For example, the processing time screen control module 105 may display the processing time screen SC4 representing the element identified by the prediction module 104. The processing time screen SC4 of FIG. 7 is an example of a load element display screen. Thus, the processing time screen SC4 of FIG. 7 can be read as being an additional element display screen. In the example of FIG. 7, the "Drawing A01.01" is identified as an element, and hence the processing time screen control module 105 identifies a processing time screen SC4 that can identify the "Drawing A01.01," which is the identified element, as an additional element display screen.

In addition, in the example of FIG. 7, there is described a case in which the element can be identified by the underlining drawn under the "Drawing A01.01," which is an element requiring a longer processing time. However, the processing time screen control module 105 may distinguish the element identified by the prediction module 104 by making a display mode of that element different from display modes of the other elements. For example, the processing time screen control module 105 may display elements identified by the prediction module 104 in a different color from the other elements, or may display only elements identified by the prediction module 104.

[Second Identification Module]

The second identification module 106 identifies a plurality of associated portions having an association with each other by analyzing a motion program for causing the controller to control an axis. For example, the second identification module 106 identifies an axis command for controlling an axis selected by the user from the motion program. The second identification module 106 identifies the identified axis command and other commands having an association with the axis command as the plurality of associated portions. It is assumed that the combination of the commands having an association is stored in advance in the data storage unit 100. When this combination of commands is included in the motion program, the second identification module 106 identifies the combination as associated portions.

In the example of FIG. 11, the second identification module 106 first identifies the command for axis control starting from MVS. This command may be a command for both an axis selected by the user and an axis not selected by the user. The second identification module 106 identifies a control block (for example, an IF statement or a WHILE statement) that includes the identified command. The second identification module 106 identifies a predetermined command written immediately before those commands are identified. This predetermined command is a command that causes temporal processing. For example, the predetermined command may be a command to wait until a certain variable becomes a specific value (command starting from IOW in FIG. 11), a command to wait for a fixed execution cycle, or a command which involves processing that spans a plurality of execution cycles. The second identification module 106 identifies the series of commands as associated portions.

[Associated Portion Display Control Module]

The associated portion display control module 107 displays the associated portion screen SC7 showing the plurality of associated portions. For example, the associated portion display control module 107 displays the associated portion screen SC7 in which a plurality of associated portions of the motion program can be identified. In the example of FIG. 11, there is described a case in which the associated portions are given a color, but the associated portions may be distinguishable by using other methods, such as underlining or italics. For example, the associated portion display control module 107 displays the associated portions by making the command starting from IOW and the command starting from MVS, which have an association with each other, different from the other portions of the motion program illustrated in FIG. 11.

[Association Module]

The association module 108 associates a plurality of rungs included in a ladder program P1 with one of a plurality of scan groups each having a specifiable execution cycle. In the first embodiment, there is described a case in which the association module 108 associates the plurality of rungs associated with one of the scan groups with another scan group, but the association module 108 may associate a plurality of rungs included in a ladder program P1 which is not associated with a scan group with a scan group.

Associating a rung with a scan group means setting such that the rung can be executed in the execution cycle of the scan group. In the first embodiment, storing a scan group and a ladder program P1 including a rung in the scan group data D3 corresponds to associating a rung with a scan group. That is, setting such that a ladder program P1 including a rung belongs to a scan group corresponds to associating a rung with a scan group.

In the example of FIG. 9, the user opens the "Drawing A01.01" in the work window W11, selects the rungs A to D, and pastes the selected rungs A to D in the work window W11 of a new ladder program P1. The user performs an operation to associate the new ladder program P1 including the rungs A to D with the scan group D. The association module 108 associates the new ladder program P1 including the rungs A to D with the scan group D. The rungs A to D may be pasted in an already-created ladder program P1 instead of a new ladder program P1. The selection and pasting of the rungs may be performed by using the operations used in copy and paste.

For example, the association module 108 associates a plurality of rungs selected after the associated rung screen SC5 is displayed with one of a plurality of scan groups. In the first embodiment, after the associated rung SC5 is displayed, a plurality of rungs are selected from the window W11 of the program creation screen SC1. The association module 108 associates the selected plurality of rungs with a scan group. The rungs may be associated with the scan group before the associated rung screen SC5 is displayed.

[Replacement Module]

The replacement module 109 replaces a register in which processing occurs in a plurality of rungs with a register corresponding to the scan group of a destination of the association by the association module 108. For example, the replacement module 109 converts a certain register into another register based on a replacement setting specified by the user in the replacement setting screen SC6. The replacement setting shows a register conversion rule. This conversion rule may be a rule for converting a register address into a variable name, or may be a rule for converting a register address.

For example, the replacement setting may be recorded in the data storage unit 100, or may be specified at the time when the user divides a rung. The replacement setting indicates the relationship between the register before conversion and the register after conversion, and hence the replacement module 109 sets the register information included in the ladder program P1 of the pasting destination so that the reference processing or the write processing to be performed on the register after conversion which is associated with the register before conversion is executed.

In the example of FIG. 9, the rungs A to D are pasted in the drawing D of the scan group D, and hence the user can specify the relationship between the register corresponding to the scan group A and the register corresponding to the scan group D as the replacement setting. The replacement module 109 replaces the variable name or register address corresponding to the scan group A included in the rungs A to D with the variable name or register address corresponding to the scan group D.

[Allocation Module]

The allocation module 110 allocates each of the plurality of scan groups to one of the plurality of processor cores included in the controller 20 so that each of the plurality of scan groups is distributed. In the first embodiment, the allocation is performed manually by the user, and hence the allocation module 110 allocates the scan group specified by the user to the processor core specified by the user. However, as in a second embodiment of the present disclosure, automatic allocation may be executed by analyzing the ladder program P1. For example, the allocation module 110 allocates the ladder program(s) P1 specified by the user to the scan group specified by the user. In the first embodiment, storing the name(s) of the ladder program(s) P1 and the name of the scan group in the scan group data D3 corresponds to allocating. Those allocations are performed from the program creation screen SC1 or another screen. For example, when the user specifies one of the created ladder programs P1 and one of the created scan groups, the allocation module 110 allocates the specified ladder program P1 to the specified scan group.

For example, the allocation module 110 allocates a first scan group to a first processor core, and allocates a second scan group to a second processor core. In the example of FIG. 6, the allocation module 110 allocates the scan groups A and B to the processor core of the CPU 21A, and allocates the scan group C to the processor core of the CPU 21B. Then, when the scan group D is created as illustrated in FIG. 9, the allocation module 110 allocates the scan group D to the CPU 21B.

1-3-2. Functions Implemented by Controller

For example, the controller 20 includes a data storage unit 200 and an execution module 201. The data storage unit 200 is implemented by the storage unit 22. The execution module 201 is implemented by the CPU 21.

[Data Storage Unit]

The data storage unit 200 stores data required to control the motor control device 30. For example, the data storage unit 200 stores ladder programs P1 and motion programs P2. The data storage unit 200 also stores a relationship between processor cores and scan groups. For example, the data storage unit 200 may store data similar to the scan group data D3. The data stored in the data storage unit 200 is not limited to the above-mentioned example. For example, the data storage unit 200 stores a plurality of variables which are at least one of referenceable or writable by the controller 20 or another device. The register in which the individual variables are stored is determined in advance.

[Execution Module]

The execution module 201 executes one or more rungs associated with one or more scan groups allocated to each of the plurality of processor cores in parallel in each execution cycle. For example, the execution module 201 executes, for each processor core included in the controller 20, the ladder programs P1 of the scan group allocated to the processor core. That is, two or more processor cores allocated by the allocation module 110 execute the ladder programs P1 of the scan group allocated to those processor cores.

In the example of FIG. 6, the execution module 201 implemented by the processor core of the CPU 21A executes the ladder programs P1 associated with the scan group A and the ladder programs P1 associated with the scan group B. The execution module 201 implemented by the processor core of the CPU 21B executes the ladder programs P1 associated with the scan group C. In the example of FIG. 9, the execution module 201 implemented by the processor core of the CPU 21B executes the ladder programs P1 associated with the scan group D.

1-4. Processing to be Executed in First Embodiment

Figure 16:
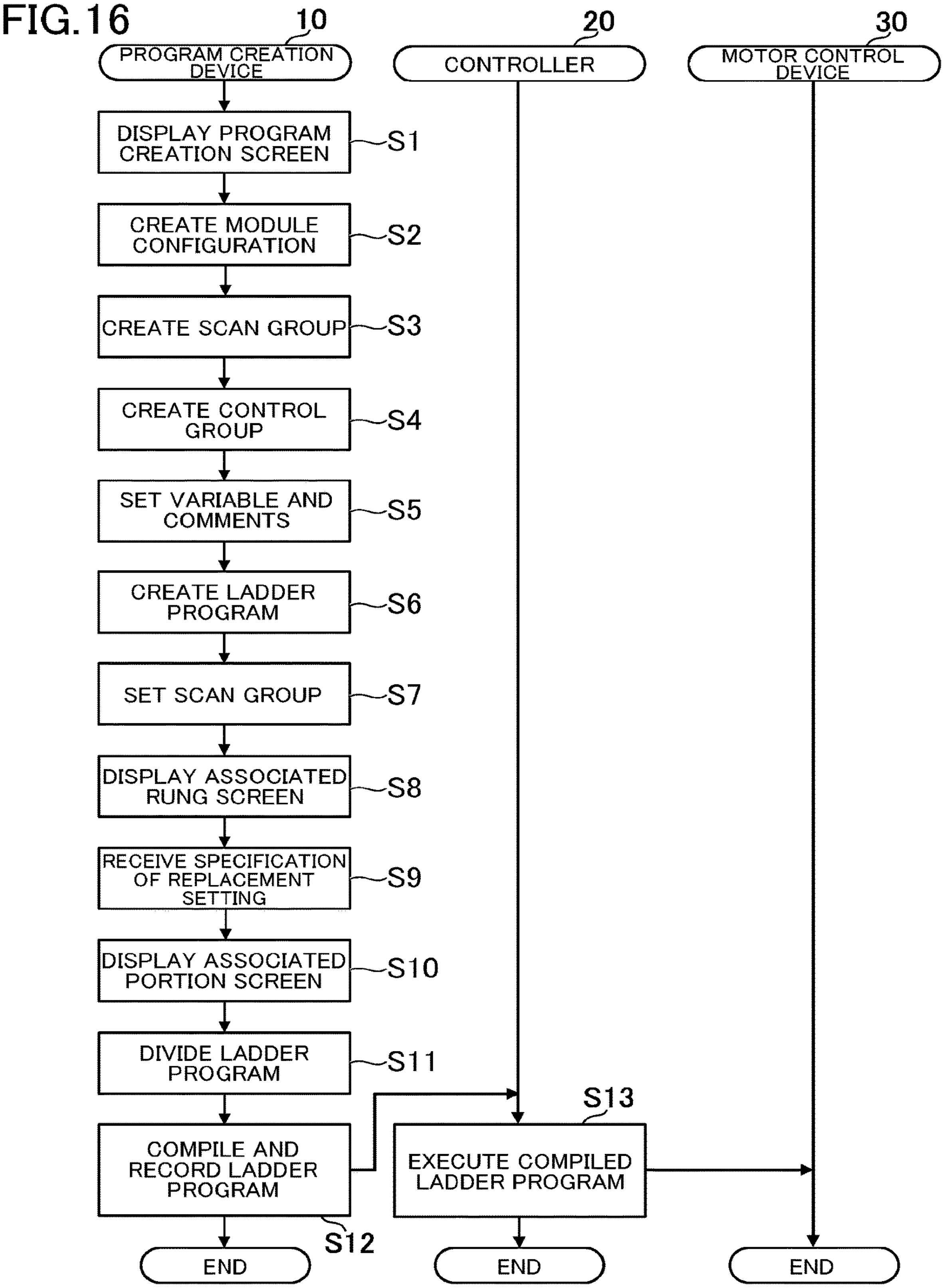
FIG. 16 is a flow chart for illustrating an example of processing to be executed in a first embodiment of the present disclosure.

FIG. 16 is a flow chart for illustrating an example of processing to be executed in the first embodiment. In FIG. 16, there is illustrated a flow in which the user creates and divides a ladder program P1. As illustrated in FIG. 16, the program creation device 10 starts the engineering tool, and displays the program creation screen SC1 on the display unit 15 (Step S1). The program creation device 10 creates a module configuration based on an operation by the user (Step S2).

The program creation device 10 displays a new creation screen SC2 on the display unit 15, and creates a scan group based on an operation by the user (Step S3). The program creation device 10 displays the control group definition screen SC3 on the display unit 15, and creates a control group (Step S4). The program creation device 10 sets variables and comments (Step S5). The program creation device 10 creates a ladder program P1 (Step S6).

The program creation device 10 displays the processing time screen SC4 on the display unit 15, and sets a scan group (Step S7). In Step S7, the program creation device 10 associates a ladder program P1 specified by the user with the scan group specified by the user. The program creation device 10 allocates the scan group specified by the user to the processor core specified by the user. In addition, settings such as specification of the execution cycle are performed. The program creation device 10 analyzes the ladder program P1 to identify the associated rungs, and displays the associated rung screen SC5 on the display unit 15 (Step S8). In Step S8, an associated rung having an association with an axis selected by the user may be identified, or an associated rung may be identified in the scan group or a ladder program P1 specified by the user.

The program creation device 10 displays the replacement setting screen SC6 on the display unit 15, and receives specification by the user of the replacement setting (Step S9). The program creation device 10 analyzes the motion program P2, identifies the associated portion, and displays the associated portion screen SC7 on the display unit 15 (Step S10). The processing steps of Step S9 and Step S10 are executed as required. The program creation device 10 divides a ladder program P1 based on an operation by the user (Step S11). In Step S11, the program creation device 10 associates a plurality of rungs selected from the ladder program P1 with a new scan group.

The program creation device 10 compiles a ladder program P1 associated with the scan group, and records the compiled ladder program P1 in the controller 20 (Step S12). The controller 20 executes the compiled ladder program P1 (Step S13). In Step S13, the controller 20 periodically executes the ladder programs P1 associated with the scan group for each processor core of the CPU 21 based on the execution cycle of the scan group allocated to the processor core.

The production system S of the first embodiment associates the plurality of rungs included in a ladder program P1 with one of a plurality of scan groups each having a specifiable execution cycle. The production system S allocates each of the plurality of scan groups to one of the plurality of processor cores included in the controller so that each of the plurality of scan groups is distributed. The production system S executes one or more rungs associated with one or more scan groups allocated to each of the plurality of processor cores in parallel in each execution cycle. As a result, the time and effort required for programming when parallel processing is implemented with a plurality of processor cores can be reduced. For example, when the user wants to extract a part of the rungs included in a certain ladder program P1, the rungs to be extracted can be associated with a new scan group, and it is thus possible to save the time and effort of creating a new ladder program P1 and associating the new ladder program P1 with the new scan group. The execution cycle can be specified for each scan group, and thus flexibility in the processing to be executed by the controller 20 is increased. Through execution of parallel scan processing by using a plurality of processor cores, it is possible to improve processing speed and distribute the processing load.

Further, the production system S identifies a plurality of associated rungs having an association with each other by analyzing a ladder program P1. As a result, it is possible to identify a plurality of associated rungs having an association with each other. For example, the time and effort required for programming can be reduced because a plurality of associated rungs can be displayed or a plurality of associated rungs can be allocated all at once.

Further, the production system S displays an associated rung screen showing a plurality of associated rungs. The production system S associates a plurality of rungs selected after the associated rung screen is displayed with one of the plurality of scan groups. As a result, the user can confirm the associated rungs and then select the plurality of rungs to be associated with the scan group, and hence it is easier for the user to perform determinations such as selecting a plurality of associated rungs all at once.

Further, the production system S identifies a plurality of associated rungs having an association with one or more axes selected by the user from the plurality of axes controlled by the controller. As a result, the user can confirm the plurality of associated rungs having an association with the axis selected by the user. This makes it easier for the user to perform determinations such as selecting a plurality of associated rungs having an association with a certain axis all at once.

Further, the production system S identifies, as the plurality of associated rungs, rungs including, as an association, at least write processing which can be traced back to write processing on a register leading to an output to the one or more axes. As a result, a plurality of associated rungs having an association regarding write processing on a register leading to an output to one or more axes selected by the user can be identified. For example, it becomes easier for the user to determine whether or not to divide rungs relating to an output to a certain specific axis all at once.

Further, the production system S further identifies, for one associated rung among the plurality of identified associated rungs, one or more associated rungs having a register or data to be processed in common with the one associated rung. Through identification of one or more associated rungs having a register or data to be processed in common, the time and effort required for programming can be reduced.

Further, the production system S predicts the processing time for the scan groups allocated to each of the plurality of processor cores. The production system S displays the processing time screen SC4 showing the relationship between the execution cycle and processing time of each of a plurality of scan groups. As a result, the user can first confirm the predicted result of the processing time of the scan group in which rungs have been allocated, and then select a plurality of rungs to be associated with the scan group.

Further, the production system S identifies, from among elements included in one scan group, an element that requires more processing time than the other elements. The production system S displays the identified element. As a result, the user can confirm elements which require more processing time than other elements, and hence it is possible to effectively support programming.

Further, the production system S identifies a plurality of associated portions having an association with each other by analyzing a motion program for causing the controller to control an axis. The production system S displays the associated portion screen SC7 indicating the plurality of associated portions. As a result, the user can confirm the portions of the motion program that have an association with each other, and hence the time and effort required for programming can be reduced.

Further, the production system S associates the plurality of rungs associated with one of the scan groups with another scan group. As a result, rungs can be moved between scan groups, and hence the time and effort required for programming can be reduced. For example, it becomes possible to create a new scan group by extracting only a part of the rungs associated with a certain scan group.

Further, the production system S replaces a register in which processing occurs in a plurality of rungs with a register corresponding to the scan group of an association destination. As a result, the register is automatically replaced, and hence user convenience is increased. Through use of the scan group of the association destination, it is possible to prevent the occurrence of processing on an incorrect register.

2. Second Embodiment

Next, description is given of a second embodiment of the present disclosure, which is another embodiment of the production system S. In the second embodiment, as an example, there is described a case in which distributed processing is implemented in the production system S without using the concept of scan groups. In the second embodiment, description of the same parts as in the first embodiment is omitted.

As described in the first embodiment, when all the processing of a ladder program P1 is executed by only the CPU 21A in order, it takes a long time for the processing to be executed because all the processing is executed by one processor core. When the processing between the CPUs 21A and 21B, the time required for the processing can be reduced. However, it takes a lot of time and effort for the user to create the ladder programs P1 for the CPU 21A and the ladder programs P1 for the CPU 21B separately. For example, even when the user has already created the ladder programs P1 on the premise of a single core, it is required to again create the ladder programs P1 for distributed processing.

Thus, the production system S of the second embodiment divides a ladder program P1 into rung units, and distributes the processing to be executed by at least a part of the plurality of rungs between the CPUs 21A and 21B, thereby shortening the time required for processing. For example, even when the user has already created the ladder programs P1 on the premise of a single core, the user can implement distributed processing by reusing the existing ladder programs P1, thereby reducing the time and effort required by the user. Details of the second embodiment are described below.

2-1. Functions Implemented in Second Embodiment

Figure 17:
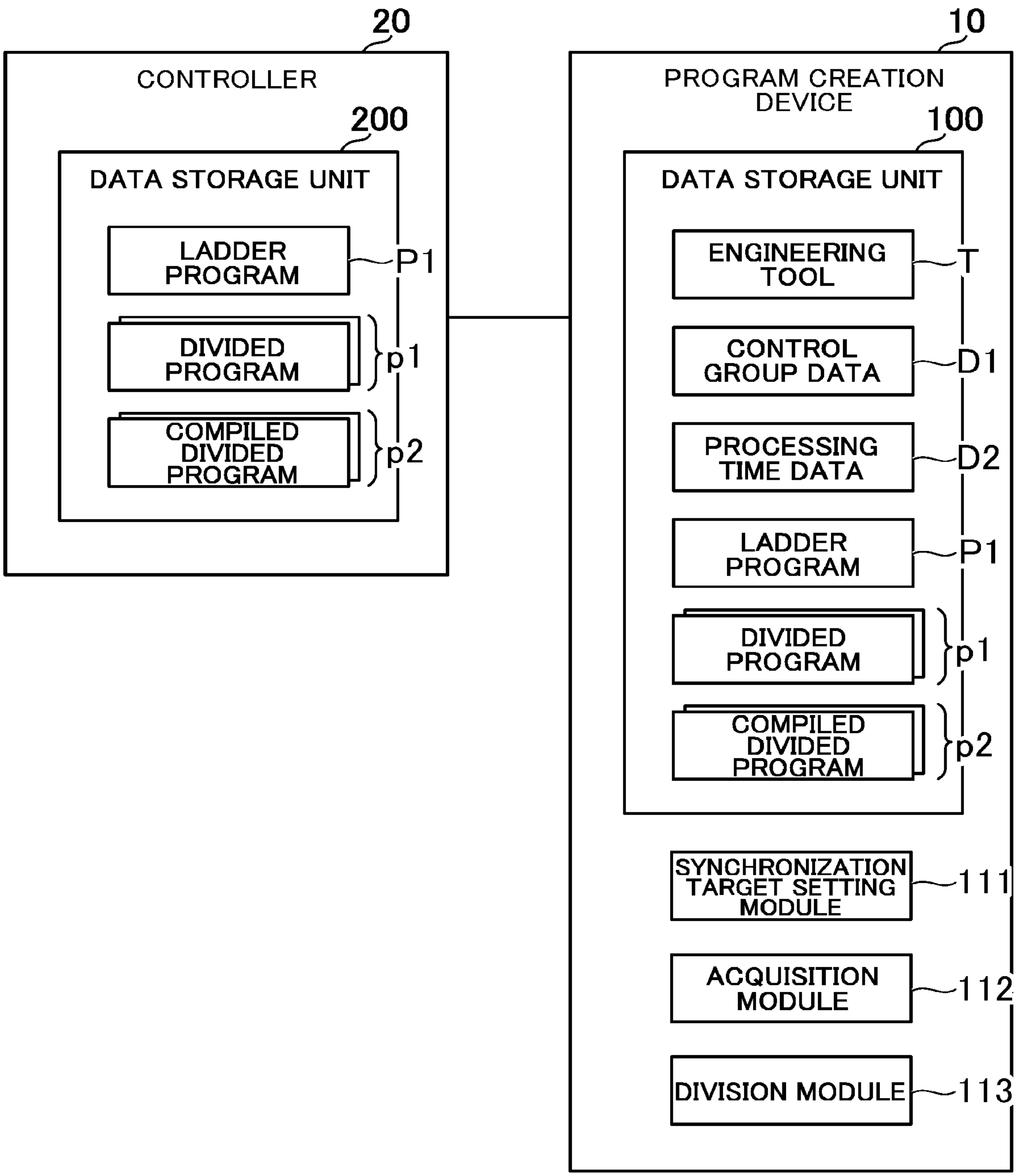
FIG. 17 is a function block diagram for illustrating an example of functions of the production system.

FIG. 17 is a function block diagram for illustrating an example of functions of the production system S.

2-1-1. Functions of Program Creation Device

The program creation device 10 of the second embodiment includes the data storage unit, a synchronization target setting module 111, an acquisition module 112, and a division module 113. The synchronization target setting module 111, the acquisition module 112, and the division module 113 are mainly implemented by the CPU 11.

[Data Storage Unit]

The data storage unit 100 stores data required to implement distributed processing by the plurality of processor cores of the controller 20. For example, the data storage unit 100 stores an engineering tool T, control group data D1, and processing time data D2. The engineering tool T is a program for the user to set the controller 20 and the motor control device 30. In the second embodiment, there is described a case in which the division of the ladder programs P1 is executed as a function of the engineering tool T, but the division of the ladder programs P1 may be implemented by a tool other than the engineering tool T.

FIG. 18 is a table for illustrating an example of the control group data D1. The control group data D1 is data which defines a control group. A control group is a set of axes to be synchronized in the same control cycle. In the controller 20, a register (hereinafter referred to as "output register") for storing an output-related value is prepared for each axis, and hence a control group can also be referred to as a set of output registers requiring synchronization in the same control cycle. The output register corresponding to each axis is hereinafter referred to as "axis output."

In the second embodiment, there is described a case in which the user specifies the axes to be synchronized from the engineering tool T, but it is not required that the axes to be synchronized be specified by the user. For example, the axes to be synchronized may be automatically set based on a control cycle set for each axis so that axes having the same control cycle belong to the same control group. Further, for example, a person other than the user operating the engineering tool T may specify the axes to be synchronized.

In the example of FIG. 18, control groups 1 and 2 exist. A predetermined control cycle (for example, 1 ms) is set for the control group 1. In the second embodiment, there is described a case in which the control group 2 is set to the same control cycle as the control group 1 (however, the axis to be synchronized is different). However, the control cycle of the control group 1 and the control cycle of the control group 2 may be different as in a modification example described later. In order to synchronize the axes to be synchronized, it is required that the timing of the write processing to be performed on the axis outputs also match.

For example, axes 1 to 6 belong to the control group 1. Axes 7 to 10 belong to the control group 2. The control group data D1 includes register identification information that can identify the axis outputs of the axes 1 to 6 belonging to the control group 1 and register identification information that can identify the axis outputs of the axes 7 to 10 belonging to the control group 2. In the second embodiment, there is described a case in which the register address (register number) corresponds to the register identification information, but the register identification information may be any information that can identify the register. For example, the register identification information may be the name of the register, or may be a combination of the starting address of the register and an offset therefrom.

The information included in the control group data D1 is not limited to the example of FIG. 18. It is sufficient that the control group data D1 include information on the control group. For example, when another output register other than an axis output (for example, an I/O output register) serves as the reference of the control group, register identification information on the another output register may be included in the control group data D1. Further, the number of control groups may be one, or three or more. The number of axes included in each control group may also be any number. The processing time data D2 may be the same as that in the first embodiment.

The data stored in the data storage unit 100 is not limited to the above-mentioned example. For example, the data storage unit 100 stores a ladder program P1 before division and a ladder program P11 after division. The data structure of the ladder program P1 before division is as described with reference to FIG. 2. For example, the ladder program P1 before division is created on the premise of being executed by a single core. The ladder program P1 before division is hereinafter simply referred to as "ladder program P1," and the ladder program P11 after division is referred to as "divided program p1."

The divided program p1 is created by the division module 113, which is described later. A plurality of divided programs p1 are created from one ladder program P1. In the second embodiment, a divided program p1 for the CPU 21A and a divided program p1 for the CPU 21B are created. Each divided program p1 is compiled and converted into a machine language to create a compiled divided program p2. The data storage unit 100 may store the compiled divided program p2. In the second embodiment, a compiled divided program p2 for the CPU 21A and a compiled divided program p2 for the CPU 21B are created.

In addition, for example, the data storage unit 100 may store other data, such as register definition data indicating the definition of the register of the controller 20 and communication setting data indicating a communication setting between the controller 20 and the motor control device 30. The configurational relationship between the axis outputs and other registers is assumed to be defined in the register definition data. The user can also define the register and configure the communication setting by using the engineering tool.

[Synchronization Target Setting Module]

The synchronization target setting module 111 sets a plurality of axes of the controller 20 as synchronization targets. The axes of the controller 20 are the axes to be controlled by the controller 20. Those axes include not only the axes directly controlled by the controller 20, but also the axes indirectly controlled by the controller 20 through another device (in the second embodiment, the motor control device 30). In the second embodiment, the synchronization target setting module 111 sets a plurality of axes specified by the user as the synchronization targets, but as described above, the axes to be synchronized may be automatically set instead of being specified by the user. The synchronization target setting module 111 sets the axes to be synchronized by recording control group data D1 indicating the axes to be synchronized in the data storage unit 100.

[Acquisition Module]

The acquisition module 112 acquires a ladder program P1 indicating operations of the controller 20. For example, the acquisition module 112 acquires the ladder program P1 from the data storage unit 100. The acquisition module 112 may acquire the ladder program P1 from the data storage unit 200 of the controller 20, another device, or an external information storage medium. When a plurality of ladder programs P1 exist, the acquisition module 112 may acquire a plurality of ladder programs P1. In this case, a divided program p1 is created for each ladder program P1.

[Division Module]

The division module 113 divides the ladder program P1 into a plurality of rungs, and allocates one or more rungs to two or more processor cores so that the processing to be executed by at least a part of the plurality of rungs is distributed to two or more different processor cores among the plurality of processor cores.

In the second embodiment, the division module 113 divides the ladder program P1 by rung units. A rung is an example of a program portion. Thus, "rung" as used herein can be read as "program portion." When the number of rungs included in the ladder program P1 is "n" ("n" is an integer of 2 or more), the division module 113 divides the ladder program P1 into "n" program portions. In the following description, an example is given in which the division module 113 divides the ladder program P1, which includes a total of 14 rungs, namely, rungs A to N, into 14 program portions.

The division module 113 may divide the ladder program P1 so that the number of rungs included in one program portion is different from the number of rungs included in another program portion. For example, the division module 113 may divide the ladder program P1 such that one program portion includes two rungs and another program portion includes only one rung. It is assumed that the plurality of rungs included in one program portion have a relation which is described later. The division module 113 may identify the relation between the rungs by using, for example, graphics or commands included in the ladder program P1, and divide the plurality of rungs having a relation as one program portion.

Further, the unit of division of the ladder program P1 is not limited to rungs. For example, the division module 113 may divide the ladder program P1 in the middle of a rung so that up to the middle of the rung is included in the program portion. For example, the division module 113 may divide the ladder program P1 into graphic units such as coils, or may divide the ladder program P1 into portions in which specific graphics are arranged. For example, when comments by the user are included in the ladder program P1, the division module 113 may divide the ladder program P1 so that a portion from a certain comment up to the next comment becomes one program portion. It is sufficient that the division module 113 divide the ladder program P1 based on a predetermined division method.

The division module 113 determines rungs to be allocated to the processor core of the CPU 21A and rungs to be allocated to the processor core of the CPU 21B from among the plurality of rungs divided from the ladder program P1. In the second embodiment, there is described a case in which the individual rungs are allocated to only one of the processor core of the CPU 21A and the processor core of the CPU 21B, but there may be rungs which are allocated to both processor cores (for example, rungs A to D in Modification Example 2-1 described later). That is, the above-mentioned "processing to be executed by at least a part of the plurality of rungs" includes not only processing of all of the rungs but also processing of only a part of the rungs.

Further, in the second embodiment, there is described a case in which the division module 113 allocates at least one rung to all processor cores included in the controller 20, but there may be processor cores to which a rung is not allocated. That is, the number of the "plurality of processor cores" and the number of the "two or more [different] processor cores" in the above description "two or more different processor cores among the plurality of processor cores" are not required to match. For example, when the controller 20 includes another processor core different from the processor core of the CPU 21A and the processor core of the CPU 21B, a rung is not required to be allocated to the another processor core. For example, the another processor core is used for another purpose, such as communication to and from the outside, rather than execution of a ladder program P1. Moreover, there may be a rung that is not allocated to the processor core of the CPU 21A or to the processor core of the CPU 21B.

Allocating a rung to a processor core means determining the processor core to act as the main executioner of the processing of the rung. In other words, determining the rung to be processed by each processor core corresponds to allocating the rung to a processor core. The number of rungs to be allocated to each processor core may be any number. When a control cycle is defined as in the second embodiment, the number of rungs to be allocated to the processor core is set to be a number that is sufficient to complete the processing in each control cycle.

In the second embodiment, the division module 113 allocates one or more rungs to the processor core of the CPU 21A and the processor core of the CPU 21B by executing three types of processing, namely, relation identification processing, grouping processing, and allocation processing. The details of those three types of processing are described below.

[Relation Identification Processing]

The relation identification processing is processing of analyzing the processing of the rung and identifying a relation between rungs. The processing of the rung is processing indicated by elements such as coils included in the rung. A rung includes one or more types of processing. The processing of at least a part of the rung becomes an analysis target in the relation identification processing. In the relation identification processing, the elements included in each rung are analyzed, and rungs having a relation with each other are identified.

The relation between rungs is based on whether or not the content of the processing of a certain rung and the content of the processing of another rung are related to each other. For example, when the completion of the execution of the processing of another rung is required in order to execute the processing of a certain rung, those rungs have a relation. Stated in another way, when the processing of a certain rung refers to the result of the execution of the processing of another rung, those rungs have a relation. For example, when it is more efficient to use the same processor core to execute the processing of a certain rung and the processing of another rung, those rungs have a relation.

In the second embodiment, the division module 113 identifies a relation among a plurality of rungs based on write processing and reference processing performed on the register of the controller 20. The division module 113 identifies rungs which perform at least one of write processing or reference processing on the same register as rungs having a relation. The division module 113 identifies rungs which include write processing on a certain register and rungs which include reference processing on the certain register as rungs having a relation.

FIG. 19 is a table for showing an example of rungs including write processing and reference processing to be performed on a register. In FIG. 19, "A" to "N" are rung names, "reg1" to "reg13" are the names of registers, and "w" means write processing. When a certain rung includes write processing to be performed on a certain register, in the table of FIG. 19, "w" is shown in the cell of this rung and register. In FIG. 19, "r" means reference processing. When a certain rung includes reference processing to be performed on a certain register, in the table of FIG. 19, "r" is shown in the cell of this rung and register. It is noted that "Gr1" and "Gr2" are the names of the axis outputs described with reference to FIG. 18, but are not used in the association identification processing.

For example, the rung A includes write processing to be performed on the register reg1. More specifically, the rung A includes processing identification information indicating write processing and register identification information indicating the register reg1 which is the target of the write processing. The processing identification information is information that can identify the processing content. For example, the processing identification information is a graphic indicating the processing, or a character string indicating a command. The register identification information is information that can identify the register. For example, the register identification information is the address of the register or the name of the register. The values to be written in the write processing may be specified within the rung, or may be acquired through by some sort of calculation.

The rung B includes reference processing to be performed on the register reg1 and write processing to be performed on the register reg2. More specifically, the rung B includes processing identification information indicating reference processing, register identification information indicating the register reg1 which is the target of the reference processing, processing identification information indicating write processing, and register identification information indicating the register reg2 which is the target of the write processing. The division module 113 identifies that rungs A and B have a relation with each other because the register identification information of the rung A and the register identification information of the rung B both indicate the register reg1. Further, the division module 113 identifies that the rung A comes before the rung B in the execution order because the processing identification information of the rung A indicates write processing and the processing identification information of the rung B indicates reference processing.

The division module 113 similarly compares the processing identification information and the register identification information included in each rung with the other rungs C to N to identify relations among the rungs. For example, when the register identification information of a certain rung and the register identification information of another rung both indicate the same register, the division module 113 identifies that there is a relation between those rungs. Among those rungs, the division module 113 identifies rungs having processing identification information indicating write processing as having an execution order before that of rungs having processing identification information indicating reference information.

Figure 20:
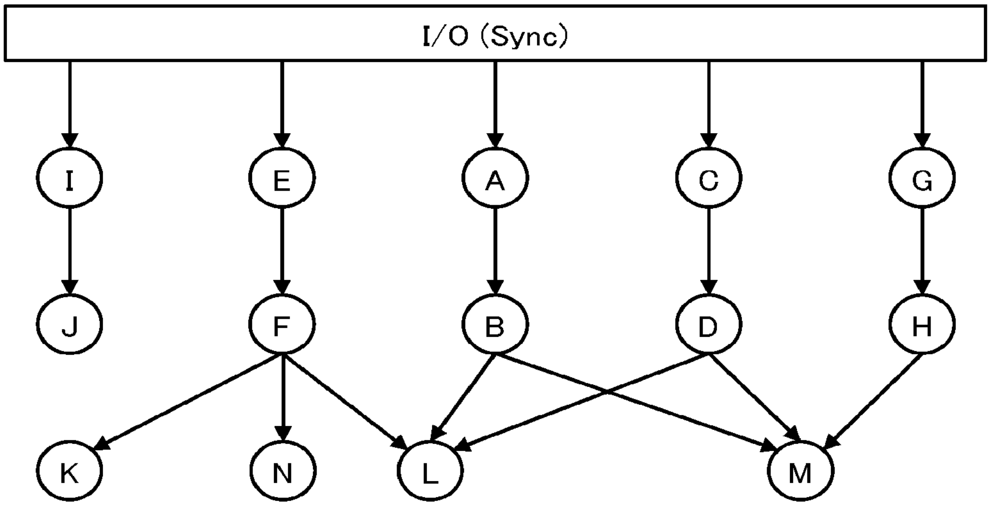
FIG. 20 is a diagram for illustrating an example of relations among rungs identified by relation identification processing.

FIG. 20 is a diagram for illustrating an example of relations among rungs identified by relation identification processing. In FIG. 20, "I/O (Sync)" means data synchronization of the registers of the controller 20. The data synchronization itself can be executed by any method, for example, by a bus connection or a network connection. The data synchronization may be executed periodically or aperiodically. For example, the data synchronization is executed every control cycle. When there are a plurality of control cycles, the data synchronization may be executed in the shortest control cycle. At least one of data synchronization between the registers of the controller 20 or data synchronization between the controller 20 and the motor control device 30 is executed.

When the time for a certain control cycle arrives, data synchronization is executed, and then the processing of the individual rung is executed. In FIG. 20, the relations among the rungs A to N are indicated by arrows. The arrows indicate the execution order. In the second embodiment, after write processing is executed on a certain register, reference processing is executed on that register, and hence an arrow extends from the rung containing the write processing to a rung containing reference processing.

For example, the rung J includes reference processing on the register reg9 on which the write processing of rung I has been executed, and hence an arrow extends from the rung I to the rung J in FIG. 20. The rung I does not include reference processing on a register on which write processing has been executed in another rung, and hence an arrow extends from the "I/O (Sync)" frame to the rung I in FIG. 20. There is no arrow extending from the rung J because the rung J does not include write processing to a register that is to be referred to in the reference processing on another rung.

In FIG. 20, the relations of the other rungs are also indicated by similar arrows. For example, the rungs E, A, C, and G do not include reference processing on a register on which write processing has been executed in another rung, and hence an arrow extends from "I/O Sync" to the rungs E, A, C, and G. The rungs F, B, D, and H include reference processing on the registers in which the write processing of rungs E, A, C, and G has been executed, respectively, and hence an arrow extends from the rungs E, A, C, and G to the rungs F, B, D, and H, respectively.

The register reg6, on which the write processing of the rung F has been executed, is referenced in the reference processing of the rungs K, L, and N, and hence an arrow extends from the rung F to the rungs K, L, and N. Similarly, the registers on which the write processing of the rungs B and D has been executed are referenced in the reference processing of the rungs L and M, and hence arrows extend from the rungs B and D to the rungs L and M. The register on which the write processing of the rung H has been executed is referenced in the reference processing of the rung M, and hence an arrow extends from the rung H to the rung M.

In the example of FIG. 20, the rungs I and J, the rungs E and F, the rungs A and B, the rungs C and D, and the rungs G and H have no association with each other, and hence parallel processing is possible. For example, even when the processing of the rungs I and J and the processing of the rungs E and F are executed simultaneously in different processor cores, parallel processing is possible because there is no wait to execute either the processing of the rungs I and J or the processing of the rungs E and F.

Meanwhile, the execution of the reference processing of the rungs K, L, and N requires completion of the write processing of the rung F. The execution of the reference processing of the rungs L and M requires completion of the write processing of the rung B. The execution of the reference processing of the rung M requires completion of the write processing of the rungs B, D, and H. In this way, there are rungs for which execution is based on the completion of the write processing of one or more other rungs. Such rungs cannot be processed in parallel, and there are also restrictions on the processing order.

In the second embodiment, "having a relation" includes not only cases in which the write processing and the reference processing on the register are directly related, but also cases in which the write processing and the reference processing on the register are indirectly related. In the example of FIG. 20, "having a relation" includes not only cases in which there is a direct connection by a downward pointing arrow, but also cases in which there is a connection via another rung. For example, the rung E and the rungs K, L, and N are connected via the rung F by downward pointing arrows, and hence those rungs E, F, K, L, and N have a relation. However, the rung F and the rung B are connected by arrows via the rung L, but the rung F and the rung B are not connected only by downward pointing arrows, and hence the rung F and the rung B do not have a relation.

The division module 113 may identify a relation between rungs by using information other than processing to be performed on the register. It is sufficient that the relation between rungs be determined based on a method determined in advance. For example, the division module 113 may determine that rungs have a relation with each other when a certain rung includes a command to call another rung or drawing. As another example, the division module 113 may identify a relation between rungs by using information on processing to be performed on a predetermined file instead of the register. This processing is write processing or reference processing to be performed on the file. For example, when the file to be processed by a certain rung is the same as the file to be processed by another rung, the division module 113 determines that those rungs have a relation.

[Grouping Processing]

Grouping processing is processing for grouping rungs. A set of rungs having the relation identified in the relation processing means that those rungs are some sort of group, but "group" in grouping processing means a classification of specific processing content. A plurality of rungs belonging to the same group are, in principle, allocated to the same processor core. It is not the case that only one group can be allocated to one processor core, and a certain group and another group may be allocated to the same processor core.

In the second embodiment, as an example, there is described a case in which the following five groups exist. The rungs belong to one or more of the five groups. In the following description, when the five groups are not distinguished, those groups are simply referred to as "groups."

(1) Control group: As described with reference to FIG. 18, grouping processing means a set of a rung which includes processing corresponding to an axis output and another rung having a relation with this rung.

(2) Specific group: Means a set of rungs which belong to only one control group (rungs which include processing specific to the control group).

(3) Common group: Means a set of rungs which belong to a plurality of control groups (rungs which include common processing among control groups).

(4) Derived group: Means a set of rungs which do not belong to a control group but have a relation with a rung which belongs to a control group (a rung which includes processing derived from processing specific to the control group).

(5) Other group: Means a set of rungs which do not belong to any of the above-mentioned groups (rungs which include other processing not belonging to the control group).

Figure 21:
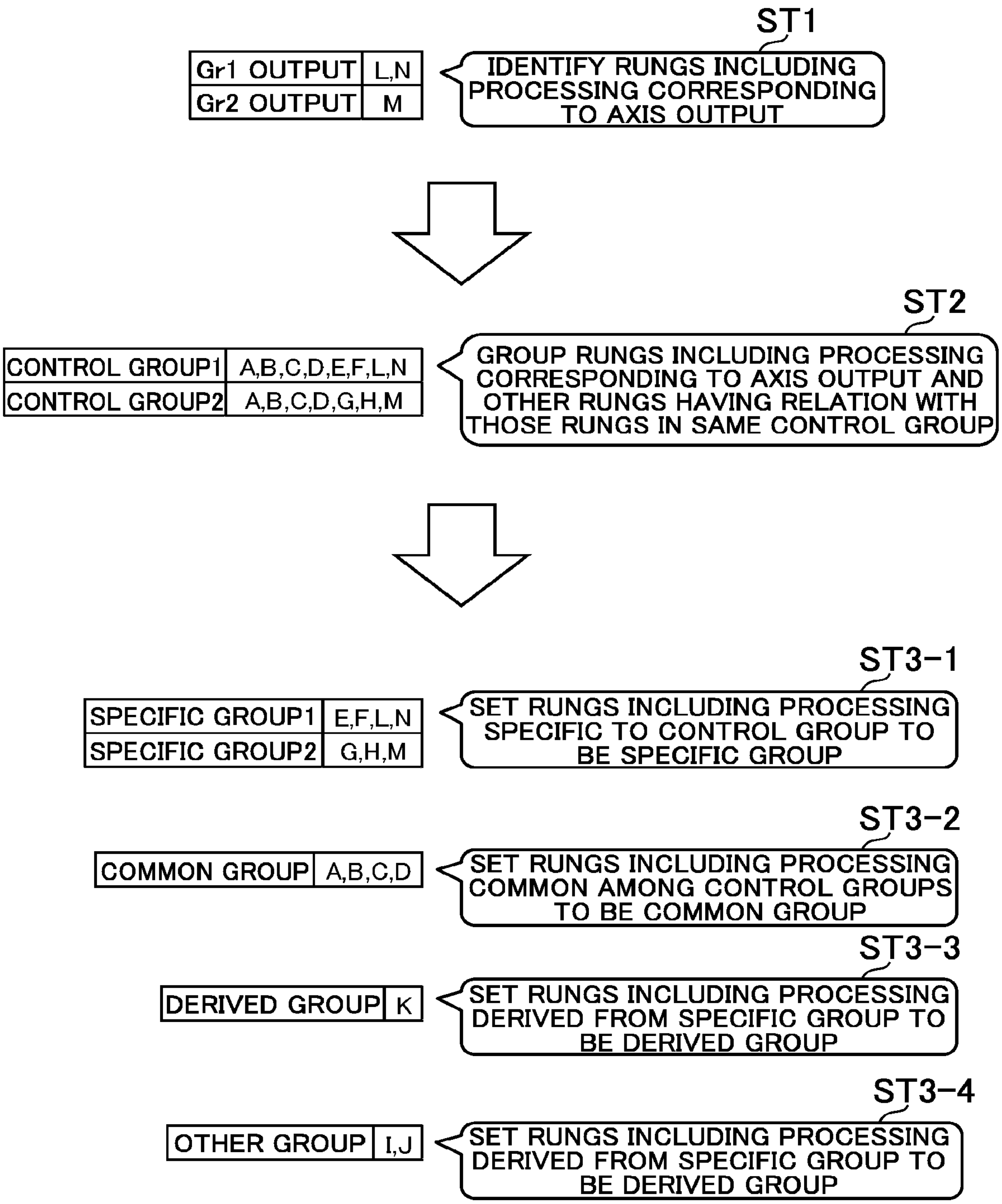
FIG. 21 is a diagram for illustrating an example of a procedure of grouping processing.
Figure 22:
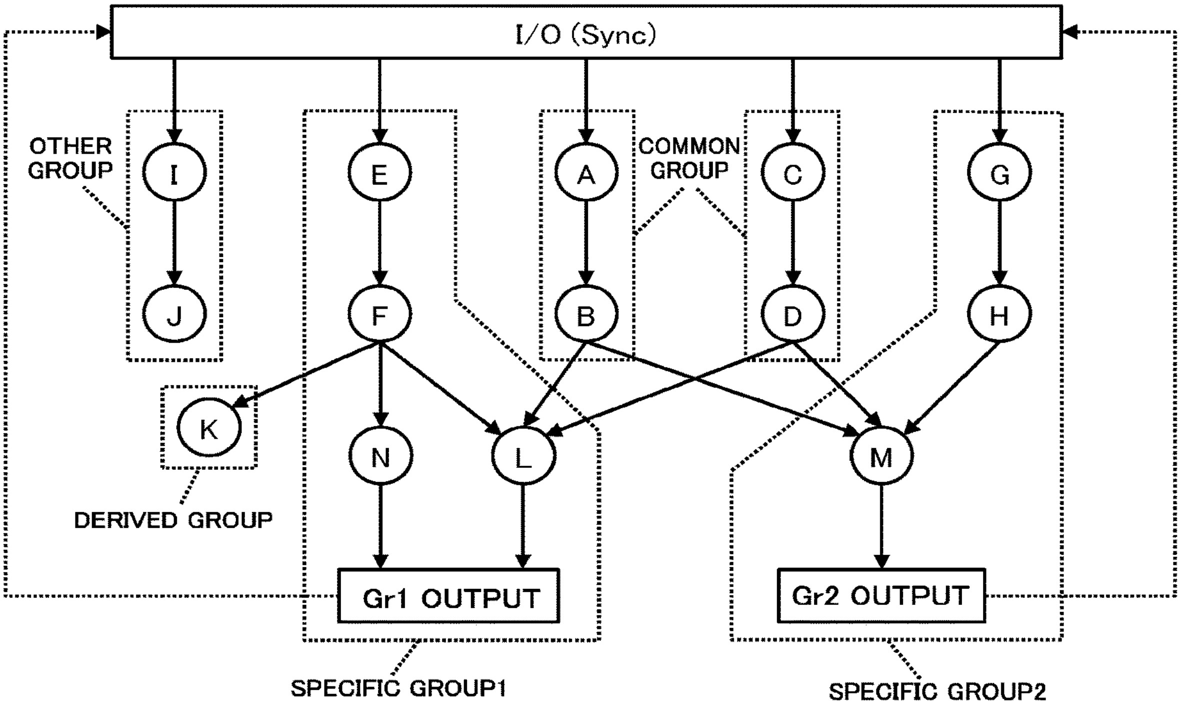
FIG. 22 is a diagram for illustrating an example of rungs grouped by the grouping processing.

FIG. 21 is a diagram for illustrating an example of a procedure of grouping processing. FIG. 22 is a diagram for illustrating an example of rungs grouped by the grouping processing. In the second embodiment, the division module 113 performs grouping such that rungs corresponding to each of a plurality of axes set as synchronization targets belong to the same group. In the second embodiment, the grouping processing includes steps from Step ST1 to Step ST3 of FIG. 21. When the grouping processing is executed up to Step ST3, the rungs are classified into the groups as illustrated in FIG. 22.

In the second embodiment, two control groups 1 and 2 are defined in the control group data D1 of FIG. 18. Here, it is assumed that the rungs N and L include write processing to the axis outputs of the control group 1 (in FIG. 18, the registers indicated by register identification information 1 to 6). Those axis outputs are indicated by the symbol Gr1 in FIG. 19, FIG. 21, and FIG. 22. Further, it is assumed that the rung M includes write processing to the axis outputs of the control group 2 (in FIG. 18, the registers indicated by register identification information 7 to 10). Those axis outputs are indicated by the symbol Gr2 in FIG. 19, FIG. 21, and FIG. 22.

First, like in Step ST1 of FIG. 21, the division module 113 analyzes each of the rungs, and identifies the rungs N and L as rungs which include processing corresponding to the axis output Gr1 defined in the control group data D1 (write processing to the axis output Gr1). Similarly, the division module 113 analyzes each of the rungs, and identifies the rung M as a rung which includes processing corresponding to the axis output Gr2 defined in the control group data D1 (write processing to the axis output Gr2).

Next, like in Step ST2, the division module 113 performs grouping such that the rungs L and N which include the processing corresponding to the axis output Gr1 and the rungs A, B, C, D, E, and F which have a relation with the rungs L and N belong to the same control group 1. The division module 113 performs groupings so that the rung M which includes the processing corresponding to the axis output Gr2 of the control group 2 and the rungs A, B, C, D, G, and H which have a relation with the rung M belong to the same control group 2.

The final step ST3 includes Step ST3-1 to Step ST3-4. Like in Step ST3-1, the division module 113 sets the rungs which include the processing specific to the control groups 1 and 2 to the specific groups 1 and 2. For example, the division module 113 performs grouping such that the rungs E, F, L, and N that do not have a relation with the rung M which includes the processing corresponding to the axis output Gr2 of the control group 2, which is different from the control group 1, belong to the specific group 1 corresponding to the control group 1. Similarly, the division module 113 performs grouping such that the rungs G, H, and M that do not have a relation with the rungs L and N which include the processing corresponding to the axis output Gr1 of the control group 1, which is different from the control group 2, belong to the specific group 2 corresponding to the control group 2.

Like in Step ST3-2, the division module 113 groups rungs which include common processing between control groups into a common group. For example, the division module 113 performs grouping such that the rungs A, B, C, and D which belong to a plurality of control groups 1 and 2 belong to a common group corresponding to the plurality of control groups 1 and 2. The rungs A and B and the rungs C and D do not have a relation therebetween, and hence the division module 113 may perform grouping such that the rungs A and B belong to a first common group, and perform grouping such that the rungs C and D belong to a second common group.

Like in Step ST3-3, the division module 113 groups the rungs which include processing derived from the specific groups 1 and 2 into a derived group. For example, as a derived group, the division module 113 groups the rung K, which has a relation with the rung F that belongs to the specific group 1 corresponding to the control group 1, but does not belong to any one of the control groups 1 and 2. The control group 2 has no corresponding rung, and hence does not have a derived group. The rung K may be treated as belonging to the specific group 1 rather than as a derived group. The division module 113 may group the rungs including processing derived from a common group into a derived group.

Like in Step ST3-4, the division module 113 groups rungs which include other processing that does not belong to the control groups 1 or 2 into the other group. For example, the division module 113 performs grouping such that the rungs I and J, which do not belong to the control groups 1 or 2, belong to the other group. The rung K may also be classified into the other group, but in the second embodiment, the other group is assumed to be the rungs I and J, which do not belong to any derived group.

In this way, the division module 113 groups a plurality of rungs based on the processing to be performed on the register of the controller 20. In the second embodiment, relations are identified based on the processing to be performed on the register, and hence the division module 113 performs grouping such that the rungs having a relation to each other belong to the same group. The division module 113 may use the relations identified in the relation identification processing as a group without further change. In this case, the relation identification processing also serves as the grouping processing.

The processing in which the division module 113 groups a plurality of rungs into a plurality of groups is not limited to the example described above. The division module 113 may analyze a plurality of rungs and group the analyzed rungs such that the rungs to be allocated to the same processor core belong to the same group. For example, the division module 113 may directly treat the relations illustrated in FIG. 20 as a group. Further, for example, the division module 113 may group only the control groups 1 and 2 of FIG. 21. In this case, grouping of the specific groups 1 and 2, the common groups, the derived groups, and the other group is not performed.

[Allocation Processing]

The allocation processing is processing of allocating one or more rungs to the processor core of the CPU 21A and the processor core of the CPU 21B. The division module 113 performs allocation so that at least a portion of the plurality of groups is distributed to two or more processor cores. In the second embodiment, there is described a case in which the two or more processor cores to which rungs are to be allocated are all of the plurality of processor cores included in the controller 20. That is, both of the two processor cores (the processor core of the CPU 21A and the processor core of the CPU 21B) included in the controller 20 correspond to the two or more processor cores to which rungs are to be allocated.

The two or more processor cores to which rungs are to be allocated may be only a part of a plurality of processor cores included in the controller 20. For example, when the controller includes three processor cores, allocation may be performed on only two of the three processor cores. In this case, the processor core to which rungs are not allocated may be used for the execution of another ladder program P1 different from the ladder program P1 which includes the rungs A to N, or may be used for a purpose other than controlling the motor control device 30, for example, for external communication.

Figure 23:
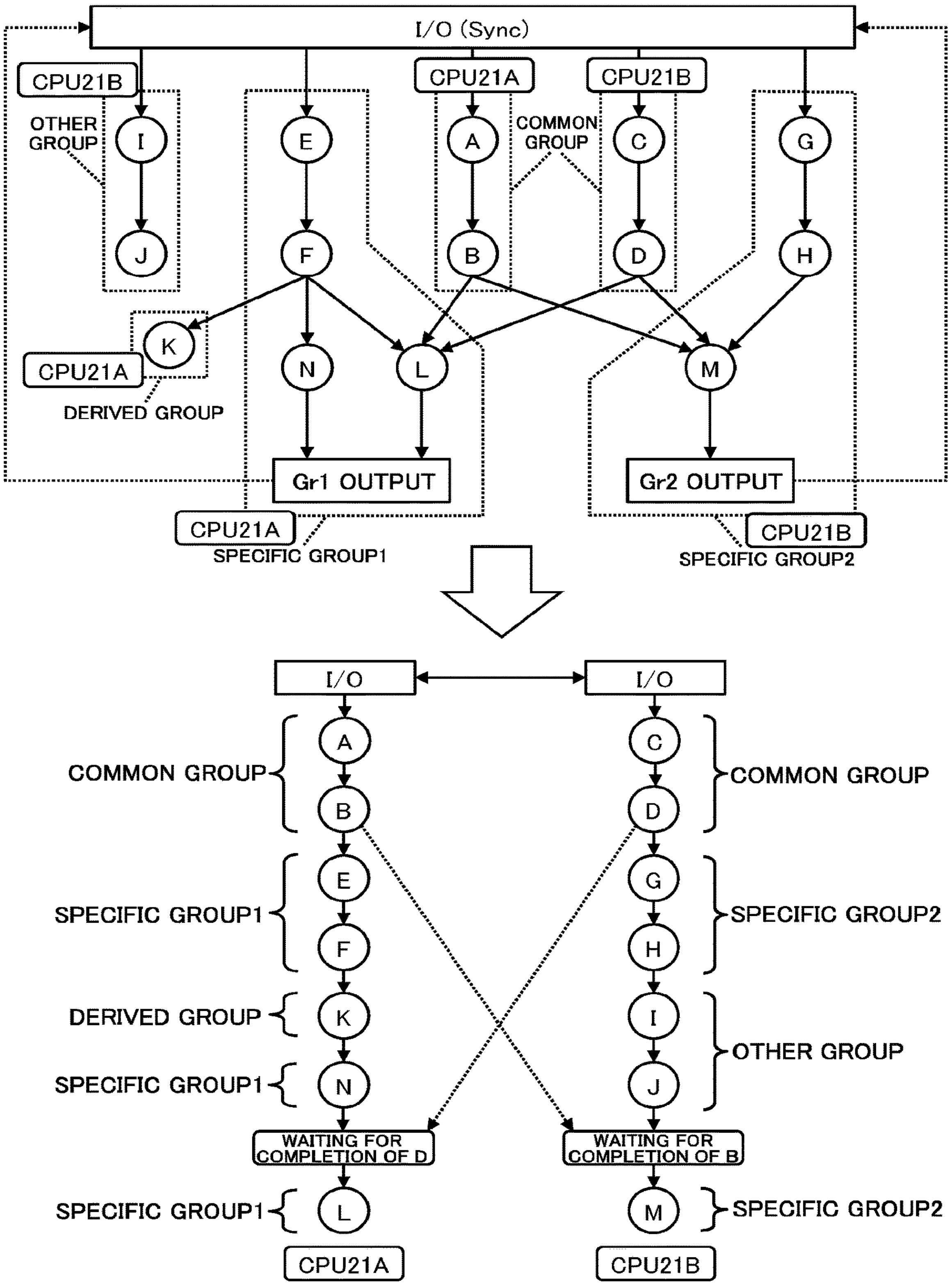
FIG. 23 is a diagram for illustrating an example of rungs allocated to processor cores by allocation processing.

FIG. 23 is a diagram for illustrating an example of rungs allocated to processor cores by allocation processing. In the second embodiment, the division module 113 allocates the plurality of rungs A, B, C, and D belonging to a common group so as to be distributed between the processor cores of the CPUs 21A and 21B. For example, the division module 113 allocates the rungs A and B belonging to the common group to the processor core of the CPU 21A. The division module 113 allocates the rungs C and D belonging to the common group to the processor core of the CPU 21B. The processing of the rungs A, B, C, and D belonging to the common group relates to the plurality of control groups 1 and 2, and hence in the example of FIG. 23, the processing of the rungs A, B, C, and D is allocated so that the processing is executed in order of which rung is relatively earlier.

The division module 113 performs allocation such that the plurality of specific groups 1 and 2 are distributed to the processor cores of the CPUs 21A and 21B. For example, the division module 113 allocates the rungs E, F, L, and N which belong to the specific group 1 to the processor core of the CPU 21A. The division module 113 allocates the rungs G, H, and M which belong to the specific group 2 to the processor core of the CPU 21B.

For example, the division module 113 performs allocation so that the execution order corresponding to the processing to be performed on the register of the controller 20 is maintained. In the case of the processor core of the CPU 21A, the division module 113 performs allocation so that the rungs N and L are executed after the rungs E and F so as to maintain the execution order of the write processing and the reference processing to be performed on the register illustrated in FIG. 19 (that is, the execution order indicated by the direction of the arrows in FIG. 23, for example). Any one of the rung N and the rung L may be processed first. In the example of FIG. 23, the division module 113 determines the order of the rungs N and L so that the rung L, which is influenced by the processing of the processor core of the CPU 21B (the processing of the rung D), is performed later. When the processing of the rung D is not completed by the time of the processing of the rung L, a wait for the execution of the processing of the rung L occurs.

Similarly, in the case of the processor core of the CPU 21B, the division module 113 performs allocation so that the rung M is executed after the rungs G and H. In the example of FIG. 23, the division module 113 determines the order of the rungs N and L so that the rung L, which is influenced by the processing of the processor core of the CPU 21B (the processing of the rung D), is performed later. When the processing of the rung B is not completed by the time of the processing of the rung M, a wait for execution of the processing of the rung M occurs. It is not required that the execution order for all of the rungs be maintained, and for rungs that can be executed in parallel, the execution order is not required to be maintained. It is sufficient that, at least, the execution order indicated by the arrows of, for example, FIG. 23 be maintained.

The division module 113 performs allocation so that the rung K belonging to the derived group is allocated to the same processor core as that of the specific group 1 from which the derived group is derived. In the example of FIG. 23, the specific group 1 is allocated to the processor core of the CPU 21A, and hence the division module 113 allocates the rung K to the processor core of the same CPU 21A. The rung K and the rungs L and N have no relation, and hence the rung K may be allocated after the rungs L and N.

The division module 113 allocates the rungs I and J belonging to the other group to any one of the processor cores of the CPUs 21A and 21B. For example, the division module 113 allocates the rungs I and J to the processor core which is relatively more free between the processor cores of the CPUs 21A and 21B. As used herein, "relatively more free" means that the processor core has a relatively lower estimated total processing time, a smaller number of allocated rungs, or a smaller number of allocated groups. The division module 113 may randomly determine the processor cores to which the rungs I and J are to be allocated. The processor core to which the rungs belonging to the other group are to be allocated may be fixed in advance, or the processor core having a higher performance may be automatically selected.

When write processing and reference processing on a common register of the controller 20 occur in each of the two rungs distributed to the two processor cores, the division module 113 may insert communication processing between processor cores after the rung of the write processing of the processor core which performs the write processing and before the rung of the reference processing of the processor core which performs the reference processing. As the communication processing, the division module 113 can insert communication processing which uses a bus connection or communication processing which uses a network connection. Various publicly known methods can be applied to the communication processing itself between the processor cores.

In the example of FIG. 23, after the rung D is completed, the division module 113 inserts processing for transmitting a notification indicating that the rung D has been completed from the processor core of the CPU 21B to the processor core of the CPU 21A. After the rung B is completed, the division module 113 inserts processing for transmitting a notification indicating that the rung B has been completed from the processor core of the CPU 21A to the processor core of the CPU 21B. The division module 113 inserts, after the rung N, processing for receiving completion of the rung D. Through this processing, when the completion of the rung D is detected, the processing of the rung L is executed. The division module 113 inserts, after the rung J, processing for receiving the completion of the rung B. Through this processing, when the completion of the rung B is detected, the processing of rung M is executed.

Further, the division module 113 may perform allocation so that the execution of the processing of one or more rungs allocated to two or more processor cores is all completed within a predetermined control cycle. The division module 113 refers to the control group data D1, and acquires the control cycles of the control groups 1 and 2. The division module 113 estimates the processing time required for each rung based on the processing time data D2. The division module 113 allocates the rungs to the processor cores so that the total processing time of the rungs to be executed by one processor core does not exceed the control cycle.

In the example of FIG. 23, the division module 113 performs allocation to the processor core of the CPU 21A so that the total processing time of the rungs A, B, E, F, K, N, and L does not exceed the control cycle of the control group 1. The division module 113 performs allocation to the processor core of the CPU 21B so that the total processing time of the rungs C, D, G, H, I, J, and M does not exceed the control cycle of the control group 2. The division module 113 may also include the time required for the above-mentioned communication processing inserted between the rungs in the total processing time.

The division module 113 creates a divided program p1 based on the rungs allocated to the processor core. For example, the division module 113 creates a divided program p1 including the rungs A, B, E, F, K, N, and L allocated to the CPU 21A. In this divided program p1, the rungs are arranged in order of rungs A, B, E, F, K, N, and L, and the divided program p1 also includes the communication processing described above. The division module 113 creates a divided program p1 including rungs C, D, G, H, I, J, and M allocated to the CPU 21A. In this divided program p1, the rungs are arranged in order of rungs C, D, G, H, I, J, and M, and the divided program p1 also includes the communication processing described above.

The division module 113 compiles the divided program p1 for each processor core, and creates a divided program p2 converted into machine language. For example, the division module 113 compiles the divided program p1 of the CPU 21A, and creates a divided program p2 to be executed by the CPU 21A. The division module 113 compiles the divided program p1 of the CPU 21B, and creates a divided program p2 to be executed by the CPU 21B. The division module 113 records the compiled divided programs p2 in the data storage unit 100 and the controller 20. Various publicly known compilers can be used as the compiler itself. A compiler that executes the above-mentioned relation processing, grouping processing, and allocation processing may be prepared, and those types of processing may be executed by the compiler.

2-1-2. Functions Implemented in Controller

The data storage unit 200 is mainly implemented by the storage unit 22. The data storage unit 200 stores data required to control the motor control device 30. For example, the data storage unit 200 stores programs in which the ladder program P1, the divided program p1, and the compiled divided program p2 have been compiled and converted into machine language. It is not required that the data storage unit 200 store the ladder program P1 and the divided program p1. Two or more processor cores to which rungs have been allocated by the division module 113 execute the processing of one or more of the rungs allocated to those processor cores. That is, two or more processor cores execute the compiled divided program p2.

The data stored in the data storage unit 200 is not limited to the above-mentioned example. For example, the data storage unit 200 stores a plurality of variables which are at least one of referenceable or writable by the controller 20 or another device. The register in which the individual variables are stored is determined in advance. For example, the user uses the engineering tool T of the program creation device 10 to define the register used to control the motor control device 30. The user can perform various settings by using the engineering tool T, for example, a setting of the motor control device 30 to be controlled and a network communication setting. The data storage unit 200 may store a file indicating the settings performed by using the engineering tool T.

2-2. Processing to be Executed in Second Embodiment

Figure 24:
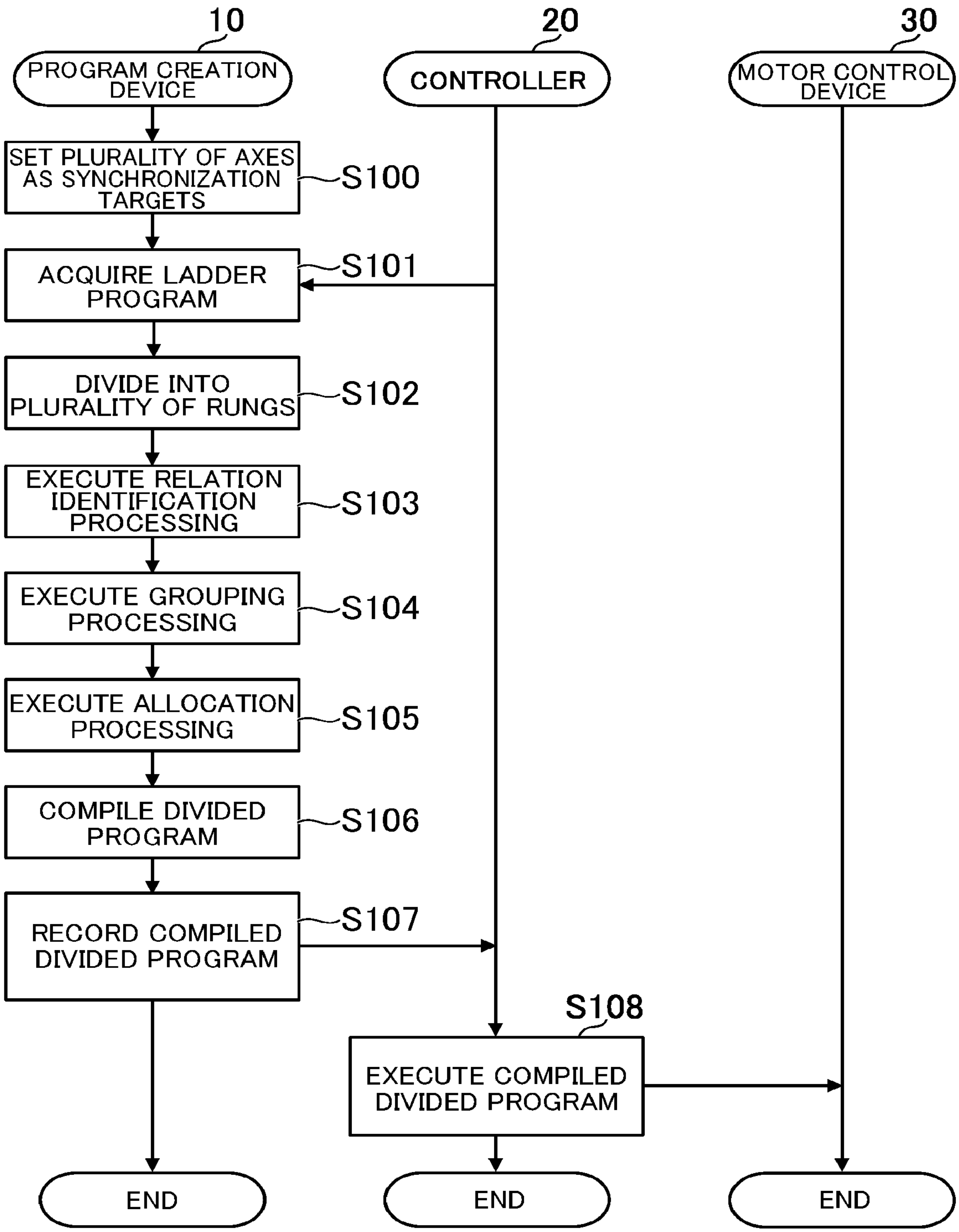
FIG. 24 is a flow chart for illustrating an example of processing to be executed by the production system.

FIG. 24 is a flow chart for illustrating an example of processing to be executed in the production system S. As illustrated in FIG. 24, the program creation device 10 starts the engineering tool T, and sets a plurality of axes specified by the user as a synchronization target (Step S100). In Step S100, the program creation device 10 creates control group data D1, and records the created control group data D1 in the storage unit 12.

The program creation device 10 acquires the ladder program P1 stored in the controller 20 (Step S101). In Step S101, the program creation device 10 displays the ladder program P1 on the display unit 15. The program creation device 10 divides the ladder program P1 into a plurality of rungs when the user performs a predetermined operation (Step S102). The program creation device 10 executes the above-mentioned relation identification processing, grouping processing, and allocation processing (Step S103 to Step S105). The program creation device creates and compiles a divided program p1 based on the allocation processing (Step S106), and records a compiled divided program p2 in the controller 20 (Step S107).

The controller 20 executes the compiled divided program p2, and controls the motor 40 by communicating to and from the motor control device 30 (Step S108). In Step S108, the processor core of the CPU 21A executes the divided program p2 corresponding to itself, and executes the processing of the rungs allocated to itself. The processor core of the CPU 21B executes the divided program p2 corresponding to itself, and executes the processing of the rung allocated to itself. The controller 20 transmits commands to the motor control device 30 based on the processing results obtained by the processor cores of the CPUs 21A and 21B. The motor control device 30 controls the motor 40 by executing the processing corresponding to the commands. The motor control device 30 transmits a response based on the processing result to the controller 20.

The production system S of the second embodiment shortens the time required for processing by distributing and executing the processing by at least part of a plurality of rungs to two or more different processor cores among a plurality of processor cores. The amount of processing executed by each processor core is reduced, and hence the processing load on the processor cores can be reduced. As a result, it is possible to prevent abnormalities from occurring in the production system S due to processing delays. Through prevention of the occurrence of abnormalities, production efficiency in the production system S also increases. Moreover, the time required for processing is shortened by the controller 20 storing the ladder program P1 itself while also storing and executing a divided program p2, which is obtained by dividing and compiling the ladder program P1. Meanwhile, the ladder program P1 and the divided program p2 can be called as one program, which enables the user to perform checking and editing without misidentifying the programs.

Further, in the production system S, the execution of the one or more rungs allocated to two or more processor cores is all completed within a predetermined control cycle, and hence the occurrence of abnormalities in the production system S due to the processing not being completed within the control cycle can be prevented. Through prevention of the occurrence of abnormalities, production efficiency in the production system S also increases. For example, even when the control cycle differs between processor cores, the processing can be completed within the control cycle corresponding to each processor core.

Further, the production system S performs allocation so that the execution order corresponding to the processing to be performed on the register of the controller 20 is maintained, and hence it is possible to execute the processing in the execution order intended by the creator of the ladder program P1. As a result, the occurrence of abnormalities in the production system S is prevented, and hence production efficiency is increased.

Further, the production system S groups each of a plurality of rungs into a plurality of groups, and performs allocation so that each of the plurality of groups is distributed to one of the plurality of processor cores. As a result, efficient distributed processing becomes possible. For example, it becomes possible to cause a processor core X to execute the processing of a group 1 and a processor core Y to execute the processing of a group 2, and hence the processing can be performed efficiently by separating the processor cores that are to execute the processing for each group. For example, when a certain group is to be executed with a plurality of processor cores, communication between the processor cores occurs, but by executing a certain group with one processor core, it is possible to prevent communication between processor cores, and hence the processing can be speeded up.

Further, by performing grouping based on the processing to be performed on the register of the controller 20, the production system S can accurately perform grouping in consideration of a relation of the processing on the registers. Accurate grouping enables the distributed processing to be more efficient.

Further, the production system S can more accurately identify relations between rungs by identifying relations among a plurality of rungs based on the write processing and reference processing to be performed on the register. Grouping such that rungs having an accurately identified relation belong to the same group enables the grouping to be performed accurately. Accurate grouping enables the distributed processing to be more efficient.

Further, the production system S can perform grouping accurately in consideration of an axis output by grouping such that a rung which includes processing corresponding to an axis output and another rung having a relation with that rung belong to the same control group. Accurate grouping enables the distributed processing to be more efficient.

Further, the production system S can perform grouping accurately by grouping such that rungs that do not have a relation with a rung which includes processing corresponding to an axis output of another control group belong to a specific control group. Accurate grouping enables the distributed processing to be more efficient.

Further, by performing grouping such that rungs belonging to a plurality of control groups belong to a common group, the production system S can classify rungs related to a plurality of axis outputs into another group, which enables the distributed processing to be more efficient.

Further, by grouping rungs that do not belong to a control group such that the rungs belong to another group, the production system S can efficiently process the rungs belonging to the other group by allocating those rungs to a free processor core.

Further, the production system S can implement efficient distributed processing when synchronizing a plurality of axes set as synchronization targets by performing grouping such that the rungs corresponding to each of the plurality of axes set as synchronization targets belong to the same group.

Further, the production system S can be operated so as to synchronize a plurality of axes specified by the user by setting the plurality of axes specified by the user as synchronization targets.

Further, when write processing and reference processing on the register of the controller 20 occur in each of two rungs distributed to two processor cores, the production system S can execute communication processing between the processor cores and implement distributed processing of the plurality of processor cores by inserting communication processing between the processor cores after the write processing rung and before the reference processing rung.

Further, the production system S can, for example, display the content of the ladder program P1 when the engineering tool T is connected to the controller 20, and execute division of the ladder program P1, by storing the ladder program P1 in the controller 20.

3. Modification Examples

The present disclosure is not limited to the embodiments described above, and can be modified suitably without departing from the spirit of the present disclosure.

3-1. Modification Example of First Embodiment

For example, the first embodiment and the second embodiment may be combined. That is, in the first embodiment as well, the production system S may further include the division module 113 which divides the ladder program P1 into a plurality of rungs, and allocates each of the plurality of rungs to one of the plurality of processor cores so that the plurality of rungs are distributed. The processing of the division module 113 is as described in the second embodiment. As a result, as described in the second embodiment, the time required for the processing of the ladder program P1 is shortened.

3-2. Modification Examples of Second Embodiment

Next, modification examples of the second embodiment are described.

Modification Example 2-1

For example, the division module 113 may perform allocation so that the rungs A, B, C, and D belonging to a common group are executed in parallel by two or more processor cores to which each of the plurality of control groups 1 and 2 are allocated. Similarly to the embodiment, there is described a case in which the two or more processor cores are both the processor core of the CPU 21A and the processor core of the CPU 21B.

Figure 25:
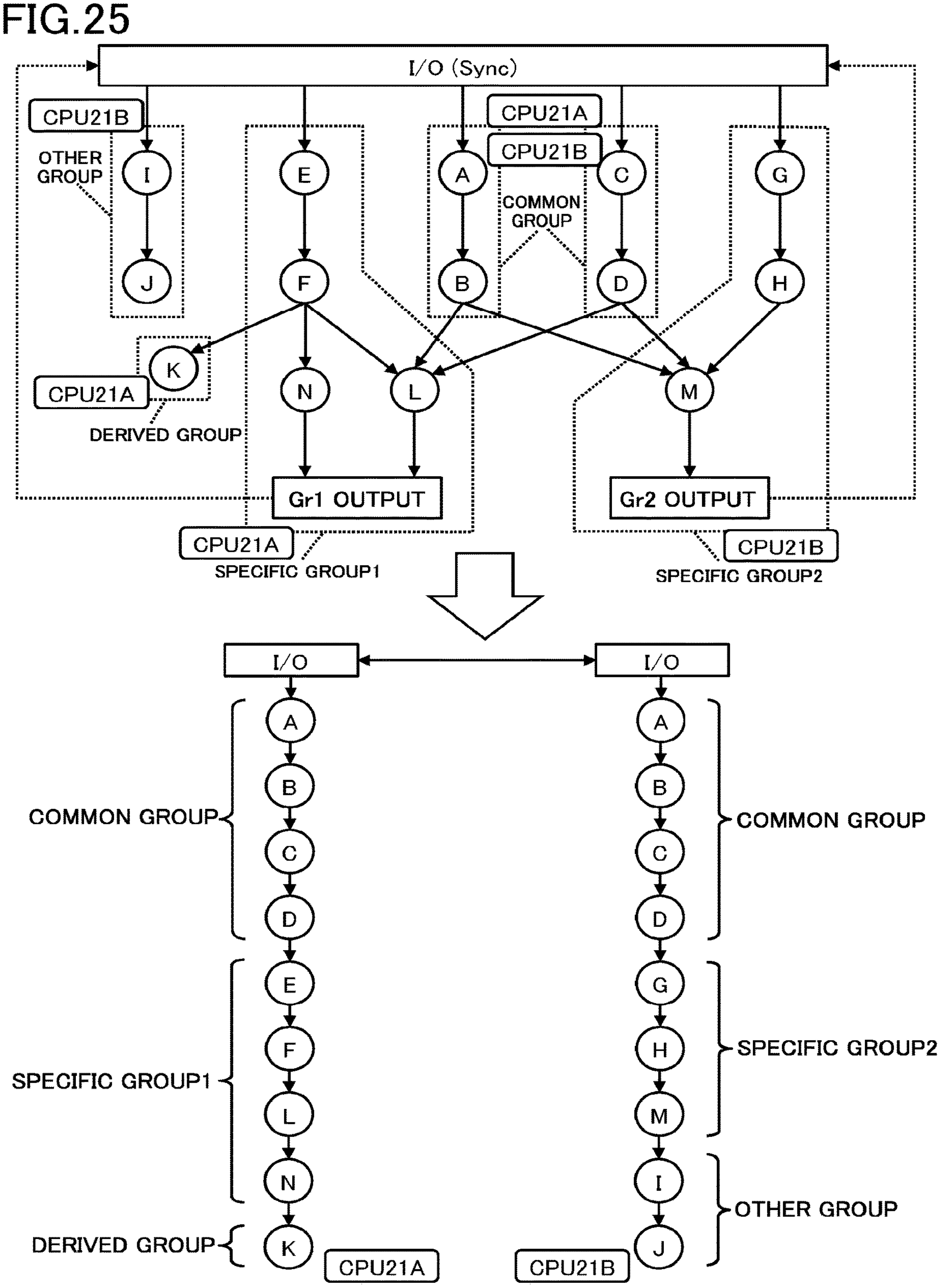
FIG. 25 is a diagram for illustrating an example of allocation in Modification Example 2-1.

FIG. 25 is a diagram for illustrating an example of allocation in Modification Example 2-1. The division module 113 allocates the rungs A, B, C, and D belonging to a common group to the processor core of the CPU 21A. The division module 113 also allocates the rungs A, B, C, and D belonging to the common group to the processor core of the CPU 21B. The allocation for the other groups may be the same as in the embodiment, but in Modification Example 2-1, the common group is allocated to both the processor core of the CPU 21A and the processor core of the CPU 21B, and hence a wait for the completion of the rungs B and D as described with reference to FIG. 23 in the second embodiment does not occur. Thus, in Modification Example 2-1, processing for inserting communication processing between the processor cores is not performed.

Further, in Modification Example 2-1, there is no waiting for the completion of the rungs B and D, and hence the division module 113 may perform allocation so that the rung L comes before the rung N. Similarly, in the example of the second embodiment, the rung K belonging to the derived group is placed before the rung L because there is a possibility that a wait for completion of the rung D occurs before the rung L, but in Modification Example 2-1, there is no waiting for the completion of the rung D, and hence the division module 113 may perform allocation such that the rung K comes after the rungs L and N.

The division module 113 may allocate a virtual register of the controller 20 to, at least, the registers used by the rungs A, B, C, and D belonging to the common group, and two or more processor cores may execute in parallel the rungs A, B, C, and D belonging to the common group based on the virtual register. A virtual register is a register different from the register originally allocated to the controller 20. The register originally allocated to the controller 20 is hereinafter referred to as "real register."

In Modification Example 2-1, there is described a case in which the division module 113 allocates a virtual register to the real registers relating to the processing of all rungs, but the division module 113 may allocate a virtual register to only the real registers relating to the processing of the rungs A, B, C, and D belonging to the common group. Further, for example, the division module 113 may allocate a virtual register to the real registers relating to the processing of the rungs A, B, C, and D belonging to the common group and allocate a virtual register to the real registers relating to the processing of a part of the other rungs. In the example of the registers in FIG. 19, there are real registers reg1 to reg13 as real registers relating to the processing of the rungs A to N. The axis outputs Gr1 and Gr2 are also real registers relating to the rungs L, M, and N, and hence virtual registers corresponding to the axis outputs Gr1 and Gr2 may be set. A free register on the controller may be used as the virtual register.

For example, the rungs A, B, C, D, E, F, K, L, and N allocated to the CPU 21A use the real registers reg1, reg2, reg3, reg4, reg5, reg6, reg11, and Gr1. Thus, the division module 113 sets corresponding virtual registers reg1A, reg2A, reg3A, reg4A, reg5A, reg6A, reg11A, and Gr1A as virtual registers for the CPU 21A. The division module 113 records the relationship between those real registers and virtual registers in the data storage unit 100.

For example, the rungs A, B, C, D, G, H, M, I, and J allocated to the CPU 21B use the real registers reg1, reg2, reg3, reg4, reg7, reg8, reg9, reg10, reg13, and Gr2. Thus, the division module 113 sets corresponding virtual registers reg1B, reg2B, reg3B, reg4B, reg7B, reg8B, reg9B, reg10B, reg13B, and Gr2B as virtual registers for the CPU 21B. The division module 113 records the relationship between those real registers and virtual registers in the data storage unit 100.

The ladder program P1 before division includes register identification information on the real register, and hence when the division module 113 creates the divided program p1, the division module 113 replaces the register identification information on each real register with register identification information on the corresponding virtual register. As a result, write processing and reference processing can be performed on the virtual registers. The other processing by the division module 113 is the same as in the embodiment.

For example, the division module 113 allocates the virtual registers so that the values of the virtual register of one of two or more processor cores is written to the axis outputs Gr1 and Gr2, which are the real registers of the controller 20, and the one of two or more processor cores writes the value of the virtual register in the register. That is, because the values relating to the final outputs are required to be written to the real registers Gr1 and Gr2, the value of a virtual register Gr1A is written to the axis output Gr1, which is the real register, and the value of a virtual register Gr2B is written to the axis output Gr2, which is the real register. The division module 113 may change the content of the rungs N, L, and M so that such writing is performed.

In Modification Example 2-1 described above, by performing allocation such that the rungs A, B, C, and D belonging to a common group are executed in parallel by a plurality of processor cores, it is possible to prevent a certain processor core from waiting for the processing of another processor core, and hence the time required for processing is shortened.

Further, by executing the rungs A, B, C, and D belonging to the common group in parallel based on virtual registers allocated to the registers used by the rungs A, B, C, and D belonging to the common group, parallel processing can be reliably executed by a plurality of processor cores. For example, in a case in which a certain processor core A tries to write to a certain register and another processor core B is in the midst of writing to that register, the processor core A may not be able to write to the register, but by using a virtual register, a situation in which it is not possible to write to the register can be prevented.

Further, by using one of two or more processor cores to write the value of the virtual register to the register, the value of the virtual register can be returned to the actual register.

Modification Example 2-2

For example, the division module 113 may perform grouping such that rungs having different control cycles belong to different groups. In Modification Example 2-2, it is assumed that the control cycle of a control group 1 and the control cycle of a control group 2 are different. A control cycle may be specified for each rung. Through execution of grouping in the same way as in the embodiment, the division module 113 can perform the grouping such that rungs having different control cycles belong to control groups 1 and 2 which are different from each other. For example, when the control cycle of the control group 1 is 1 ms and the control cycle of the control group 2 is 2 ms, the division module 113 performs grouping such that the rungs having a control cycle of 1 ms belong to the control group 1 and the rungs having a control cycle of 2 ms belong to the control group 2.

The division module 113 may perform allocation so that, when allocating a rung which also relates to a processor core corresponding to a group having a relatively early control cycle to a processor core corresponding to a group having a relatively late control cycle, the rung is executed relatively early. For example, the common group relates to the control group 1 having a control cycle of 1 ms as well as to the control group 2 having a control cycle of 2 ms. In this case, the division module 113 performs allocation so that the execution order of the rungs belonging to the common group is earlier than the execution order of other rungs (for example, so that those rungs are executed first).

In Modification Example 2-2, by performing grouping such that rungs having different control cycles belong to different groups from each other, control with different control cycles can be executed.

Further, when allocating a rung which also relates to a processor core corresponding to a group having a relatively early control cycle to a processor core corresponding to a group having a relatively late control cycle, by performing allocation such that rungs which are common among processor cores are executed early, it is possible to execute those rungs at an early stage, thereby preventing those rungs from waiting for execution.

For example, the controller 20 may include a processor core which has not been allocated rungs by the division module 113. For example, the controller 20 may include three CPUs 21, and of those CPUs 21, the division module 113 may allocate rungs to two of the CPUs 21 and not allocate rungs to the remaining one CPU 21. Each of the plurality of processor cores executes the one or more rungs allocated to itself.

3-3. Other Modification Examples

For example, each function may be implemented by any device in the production system S. A part or all of the functions described as being implemented by the program creation device 10 may be shared among a plurality of devices. A part or all of the functions described as being implemented by the controller may be implemented by the program creation device 10, the motor control device 30, or another device.

While there have been described what are at present considered to be certain embodiments of the invention, it will be understood that various modifications may be made thereto, and it is intended that the appended claims cover all such modifications as fall within the true spirit and scope of the invention.

What is claimed is:

1. A production system, comprising:
circuitry configured to:
associate a plurality of rungs included in a ladder program with one of a plurality of scan groups each being a set of programs which are executed in a predetermined execution cycle that is specified by a user;
allocate each of the plurality of scan groups to one of a plurality of processor cores of a controller so that each of the plurality of scan groups is distributed; and
execute one or more rungs associated with one or more scan groups allocated to each of the plurality of processor cores in parallel based on each of the execution cycles that is specified by the user.

2. The production system according to claim 1, wherein the circuitry is configured to identify a plurality of associated rungs having an association with each other by analyzing the ladder program.

3. The production system according to claim 2, wherein the circuitry is configured to identify a plurality of associated rungs having an association with one or more axes selected by a user from among a plurality of axes controlled by the controller.

4. The production system according to claim 3, wherein the circuitry is configured to identify, as the plurality of associated rungs, rungs including, as the association, at least write processing which is traceable back to write processing on a register leading to an output to the one or more axes.

5. The production system according to claim 4, wherein the circuitry is configured to further identify, for one associated rung among the plurality of identified associated rungs, one or more associated rungs having a register or data to be processed in common with the one associated rung.

6. The production system according to claim 4, wherein the circuitry is configured to:
predict a processing time relating to each of the plurality of scan groups allocated to one of the plurality of processor cores; and display a processing time screen showing a relationship between the execution cycle and the processing time of each of the plurality of scan groups.

7. The production system according to claim 3, wherein the circuitry is configured to further identify, for one associated rung among the plurality of identified associated rungs, one or more associated rungs having a register or data to be processed in common with the one associated rung.

8. The production system according to claim 3, wherein the circuitry is configured to:

predict a processing time relating to each of the plurality of scan groups allocated to one of the plurality of processor cores; and display a processing time screen showing a relationship between the execution cycle and the processing time of each of the plurality of scan groups.

9. The production system according to claim 2, wherein the circuitry is configured to:

display an associated rung screen indicating the plurality of associated rungs, and associate a plurality of rungs selected after the associated rung screen is displayed with one of the plurality of scan groups.

10. The production system according to claim 9, wherein the circuitry is configured to identify a plurality of associated rungs having an association with one or more axes selected by a user from among a plurality of axes controlled by the controller.

11. The production system according to claim 9, wherein the circuitry is configured to:

predict a processing time relating to each of the plurality of scan groups allocated to one of the plurality of processor cores; and display a processing time screen showing a relationship between the execution cycle and the processing time of each of the plurality of scan groups.

12. The production system according to claim 2, wherein the circuitry is configured to:

predict a processing time relating to each of the plurality of scan groups allocated to one of the plurality of processor cores; and display a processing time screen showing a relationship between the execution cycle and the processing time of each of the plurality of scan groups.

13. The production system according to claim 1, wherein the circuitry is configured to:

predict a processing time relating to each of the plurality of scan groups allocated to one of the plurality of processor cores; and display a processing time screen showing a relationship between the execution cycle and the processing time of the each of the plurality of scan groups.

14. The production system according to claim 13, wherein the circuitry is configured to:

identify, from among elements included in one scan group, an element that requires more processing time than elements other than the element, and display a load element display screen representing the element.

15. The production system according to claim 1, wherein the circuitry is configured to:

identify a plurality of associated portions having an association with each other by analyzing a motion program for causing the controller to control an axis; and display an associated portion screen showing the plurality of associated portions.

16. The production system according to claim 1, wherein the circuitry is configured to associate a plurality of rungs associated with one of the plurality of scan groups with another scan group.

17. The production system according to claim 1, wherein the circuitry is configured to replace a register in which processing occurs in a plurality of rungs with a register corresponding to one of the plurality of scan groups of a destination of the association.

18. The production system according to claim 1, wherein the circuitry is configured to divide the ladder program into a plurality of rungs, and to allocate each of the plurality of rungs to one of the plurality of processor cores so that the plurality of rungs are distributed.

19. A program creation device, comprising circuitry configured to:

create a ladder program;

associate a plurality of rungs included in the ladder program with one of a plurality of scan groups each being a set of programs which are executed in a predetermined execution cycle that is specified by a user; and allocate each of the plurality of scan groups to one of a plurality of processor cores of a controller so that each of the plurality of scan groups is distributed.

20. A non-transitory information storage medium having stored thereon a program for causing a computer to:

associate a plurality of rungs included in a ladder program with one of a plurality of scan groups each being a set of programs which are executed in a predetermined execution cycle that is specified by a user; and allocate each of the plurality of scan groups to one of a plurality of processor cores of a controller so that each of the plurality of scan groups is distributed.

* * * * *